US010814956B2

(12) United States Patent
Chungbin

(10) Patent No.: US 10,814,956 B2
(45) Date of Patent: *Oct. 27, 2020

(54) MECHANICAL FASTENING SYSTEM AND ASSOCIATED STRUCTURAL ASSEMBLY AND METHOD

(71) Applicant: The Boeing Company, Chicago, IL (US)

(72) Inventor: Jerry D. Chungbin, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,134

(22) Filed: Apr. 2, 2019

(65) Prior Publication Data

US 2019/0225320 A1 Jul. 25, 2019

Related U.S. Application Data

(63) Continuation-in-part of application No. 15/147,002, filed on May 5, 2016, now Pat. No. 10,286,998.

(51) Int. Cl.
*B64C 3/18* (2006.01)
*F16B 5/02* (2006.01)
*F16B 5/06* (2006.01)

(52) U.S. Cl.
CPC .............. *B64C 3/187* (2013.01); *F16B 5/02* (2013.01); *F16B 5/0607* (2013.01)

(58) Field of Classification Search
CPC ... B64C 3/18; B64C 3/187; B64F 5/10; B64F 5/40; F16B 5/02; F16B 5/06;

(Continued)

(56) References Cited

U.S. PATENT DOCUMENTS 1,687,777 A * 10/1928 McMurtrie ........... B23B 31/101
 279/112
3,827,661 A 8/1974 Ryan et al.
(Continued)

FOREIGN PATENT DOCUMENTS

DE 7811183 7/1978
EP 3 241 739 11/2017
(Continued)

OTHER PUBLICATIONS

European Patent Office, Extended European Search Report, EP 17 16 7311 (dated Oct. 4, 2017).
(Continued)

*Primary Examiner* — Jonathan P Masinick
(74) *Attorney, Agent, or Firm* — Walters & Wasylyna LLC

(57) ABSTRACT

A structural assembly including a first structural member defining a first partial bore and including a first protrusion and a second protrusion, a second structural member defining a second partial bore and including a first protrusion and a second protrusion, wherein the second partial bore is aligned with the first partial bore to define a through-bore, a shaft extending through the through-bore, wherein the shaft includes a first end portion and a second end portion, a first engagement member proximate the first end portion, wherein the first engagement member engages both the first protrusion of the first structural member and the first protrusion of the second structural member, and a second engagement member proximate the second end portion, wherein the second engagement member engages both the second protrusion of the first structural member and the second protrusion of the second structural member.

20 Claims, 25 Drawing Sheets

(58) Field of Classification Search
CPC .... F16B 5/0607; F16B 5/0621; F16B 5/0635; F16B 2200/403; F16B 2200/406; F16B 2200/50; F16B 2200/509; F16B 2/065; Y10T 403/7047; Y10T 403/7051; Y10T 403/7052; Y10T 403/7056; F16D 1/08; F16D 1/0829; F16D 1/0841; F16D 1/0864

See application file for complete search history.

(56) References Cited

U.S. PATENT DOCUMENTS

| | | | |
|---|---|---|---|
| 4,356,616 A | | 11/1982 | Scott |
| 4,600,334 A | * | 7/1986 | Soussloff ................ F16D 1/094 242/573 |
| 5,067,847 A | * | 11/1991 | Muellenberg ........... F16D 1/094 403/342 |
| 5,474,403 A | * | 12/1995 | Hetrich ................... F16D 1/094 403/369 |
| 6,386,481 B1 | | 5/2002 | Kallinen |
| 8,596,600 B2 | * | 12/2013 | Spencer ............... A47B 97/001 248/447.1 |
| 9,618,051 B2 | * | 4/2017 | Heston .................... F16D 1/094 |
| 2005/0220534 A1 | * | 10/2005 | Ober ...................... B65H 75/08 403/370 |
| 2005/0236524 A1 | | 10/2005 | Sarh |
| 2008/0144986 A1 | * | 6/2008 | Wajda .................. F16C 35/073 384/538 |

FOREIGN PATENT DOCUMENTS

| | | |
|---|---|---|
| EP | 3 260 708 | 12/2017 |
| GB | 194 516 | 3/1923 |
| WO | WO2008012569 | 1/2008 |

OTHER PUBLICATIONS

European Patent Office, Extended European Search Report, App. No. 20167358.9 (dated Sep. 8, 2020).

* cited by examiner

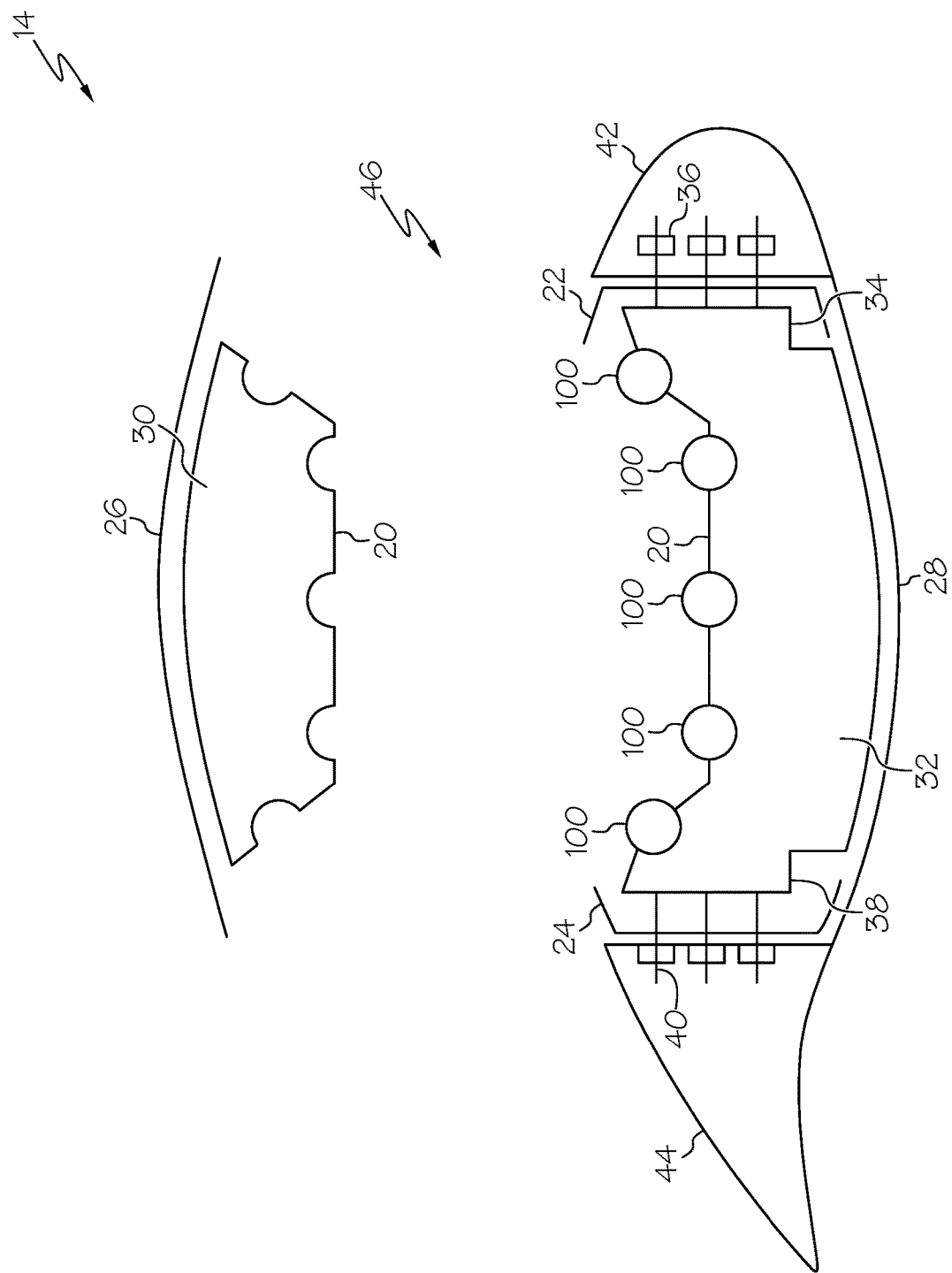

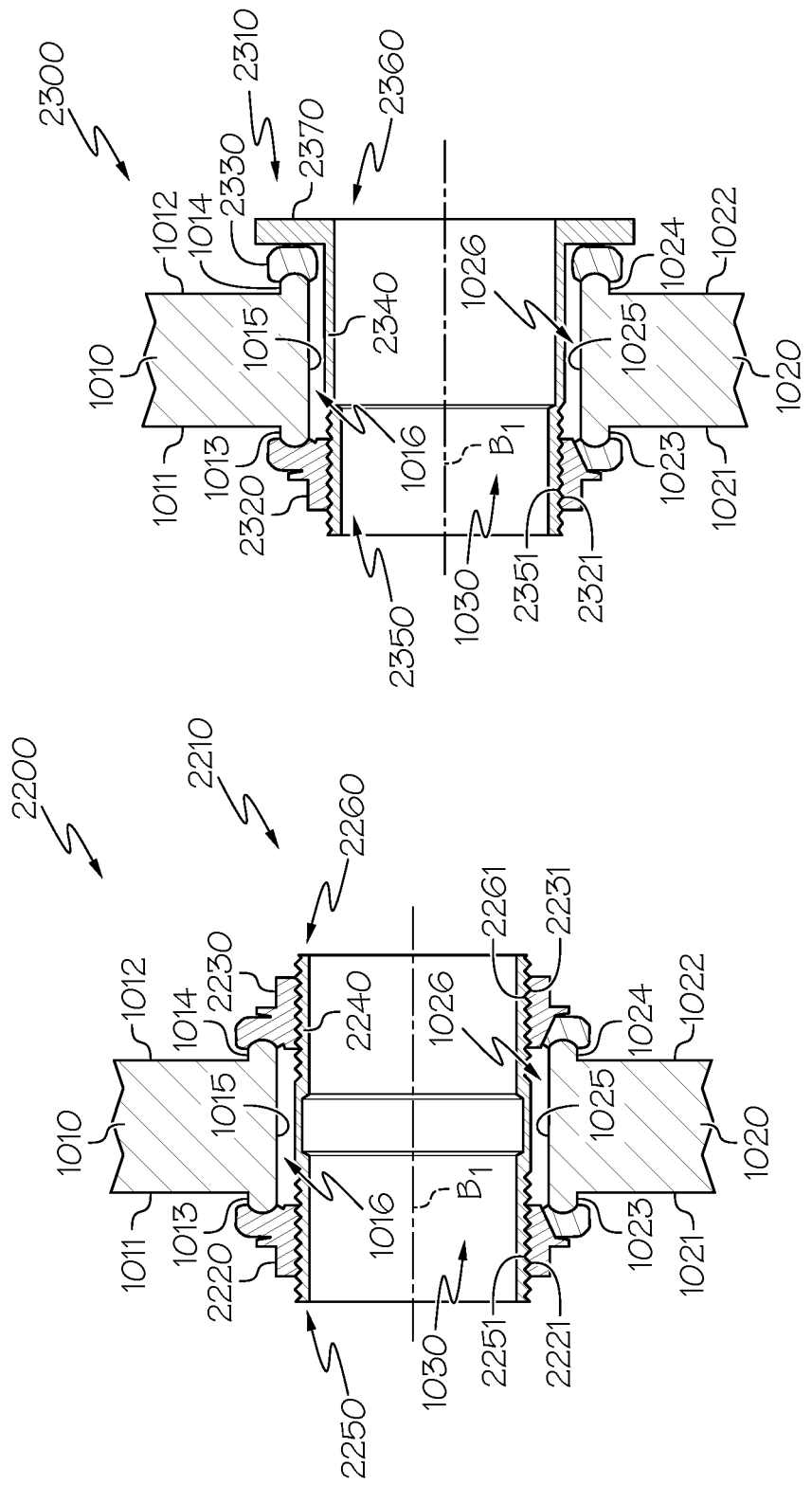

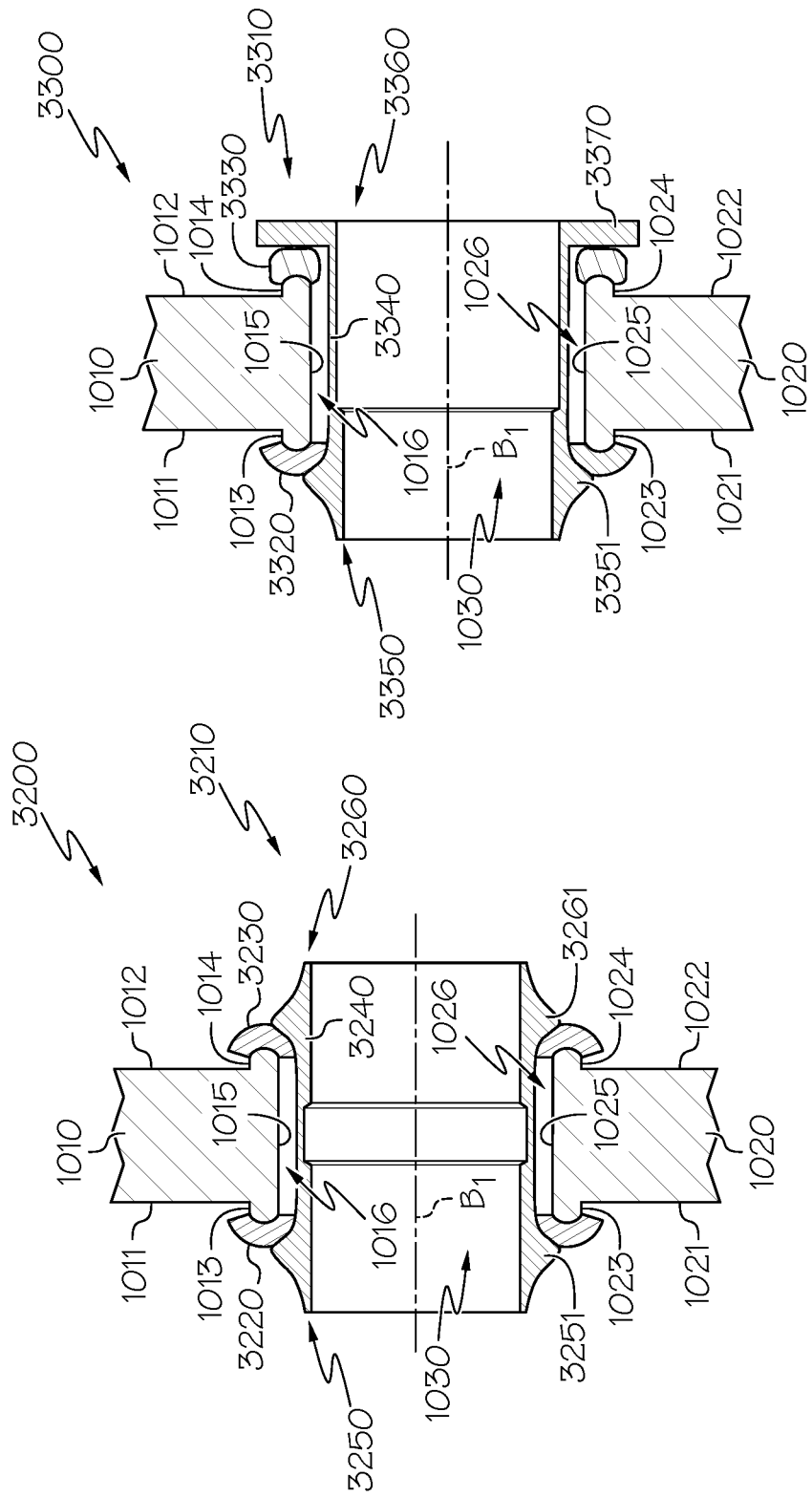

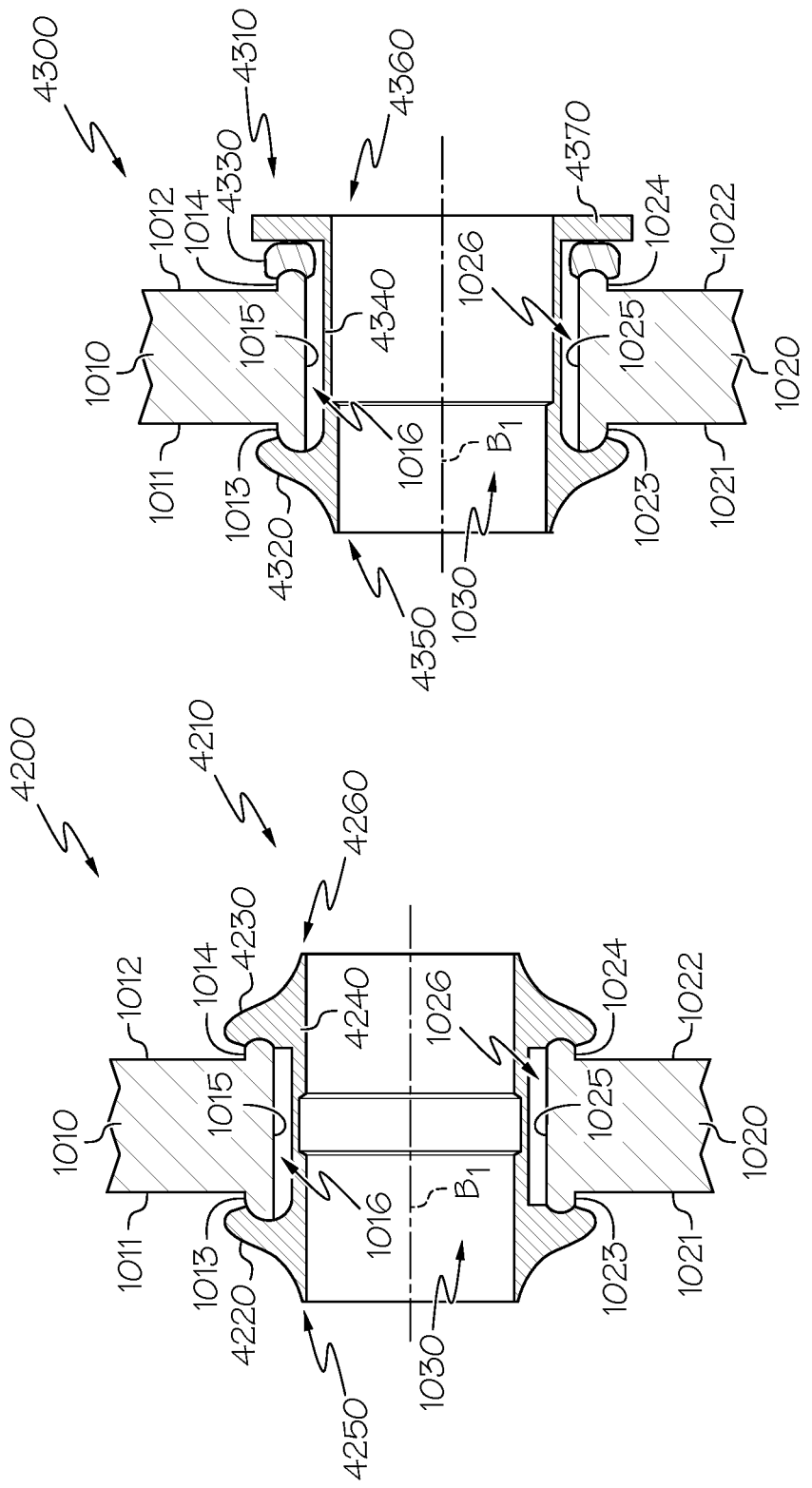

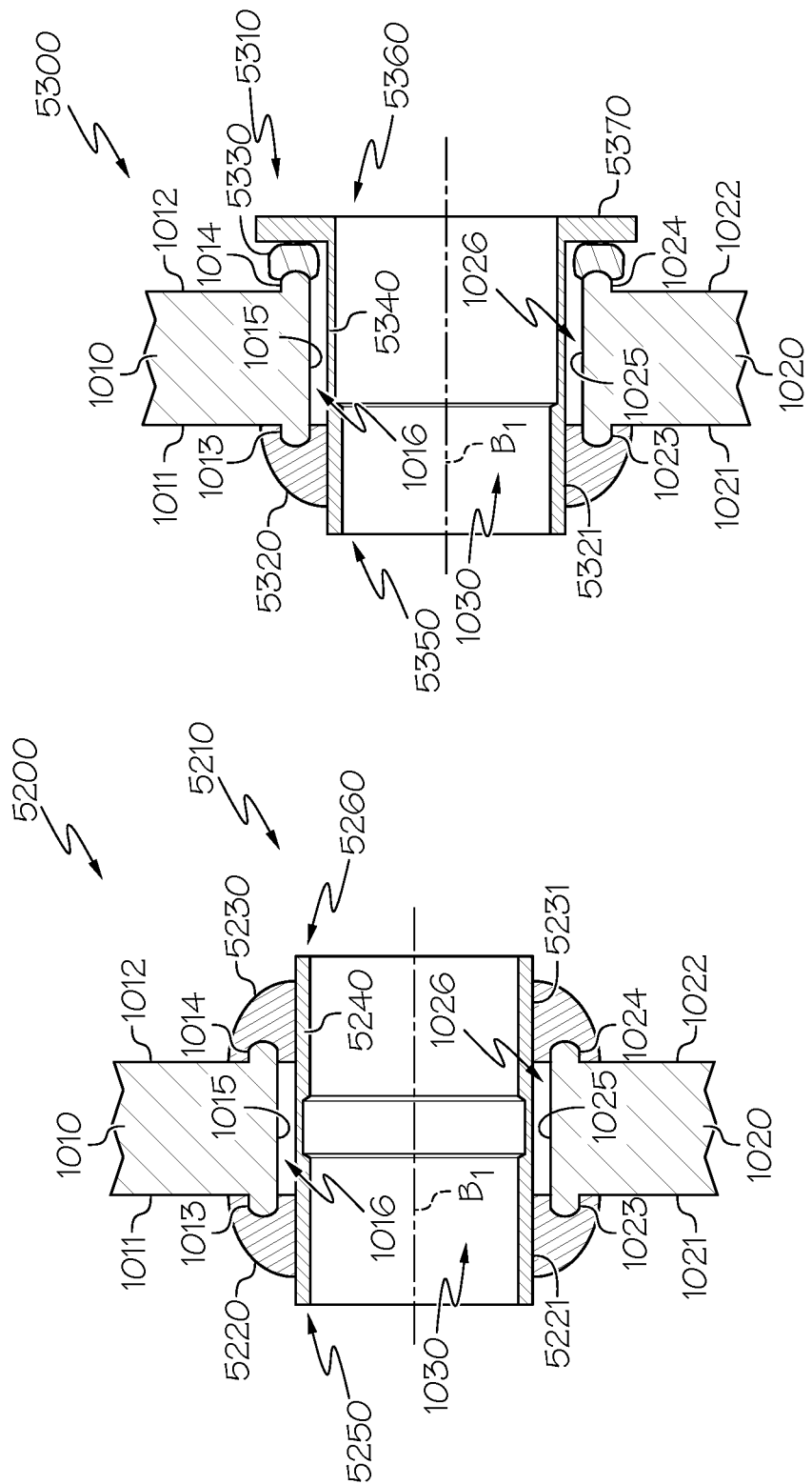

US 10,814,956 B2

MECHANICAL FASTENING SYSTEM AND ASSOCIATED STRUCTURAL ASSEMBLY AND METHOD

PRIORITY

This application is a continuation-in-part of U.S. Ser. No. 15/147,002 filed on May 5, 2016.

FIELD

This application relates to the joining of structural members and, more particularly, to a mechanical fastening system for joining one structural member to one or more other structural members.

BACKGROUND

The wing of an aircraft is typically constructed from ribs, spars and skin panels (e.g., an upper skin panel and a lower skin panel). Specifically, the ribs are spaced apart from each other along the length of the wing. The forward ends of the ribs are connected to the forward spar, while the aft ends of the ribs are connected to the aft spar. The upper skin panel is connected to the upper portion of each rib, while the lower skin panel is connected to the lower portion of each rib.

Thus, the ribs, the spars and the skin panels define an enclosed wing box that, for certain aircraft, may be used as a tank for fuel storage purposes. Once the wing box is enclosed, any work that must be performed in the wing requires personnel to enter a confined space. Therefore, various safety precautions must be taken, which increases the overall cost of aircraft manufacture.

To avoid the confined space issue, split wing designs were developed. As one example, a two-piece rib was used, wherein the upper skin panel was connected to an upper rib portion and the lower skin panel was connected to a lower rib portion. Therefore, the wing box may be opened to facilitate work or inspection, and then closed by joining the upper rib portion with the lower rib portion. However, the process of aligning and joining the upper and lower rib portions is time consuming and the fasteners used add significant weight to the aircraft.

Accordingly, those skilled in the art continue with research and development efforts directed to the joining of structural members.

SUMMARY

A structural assembly is disclosed. In one example, the disclosed structural assembly includes a first structural member having a first side and a second side opposite the first side, and defining a first partial bore extending from the first side to the second side, the first structural member further including a first protrusion protruding proximate a periphery of the first partial bore on the first side of the first structural member and a second protrusion protruding proximate the periphery of the first partial bore on the second side of the first structural member, a second structural member including a first side and a second side opposite the first side, and defining a second partial bore extending from the first side to the second side, the second structural member further including a first protrusion protruding proximate a periphery of the second partial bore on the first side of the second structural member and a second protrusion protruding proximate the periphery of the second partial bore on the second side of the second structural member, wherein the second partial bore is aligned with the first partial bore along a bore axis to define a through-bore, a shaft extending through the through-bore, wherein the shaft includes a first end portion and a second end portion longitudinally opposed from the first end portion, a first engagement member proximate the first end portion, wherein the first engagement member engages both the first protrusion of the first structural member and the first protrusion of the second structural member, and a second engagement member proximate the second end portion, wherein the second engagement member engages both the second protrusion of the first structural member and the second protrusion of the second structural member.

In another example, the disclosed structural assembly includes a first structural member including a first side and a second side opposite the first side, and defining a first partial bore extending from the first side to the second side, the first structural member further including a first protrusion protruding proximate a periphery of the first partial bore on the first side of the first structural member and a second protrusion protruding proximate the periphery of the first partial bore on the second side of the first structural member, a second structural member including a first side and a second side opposite the first side, and defining a second partial bore extending from the first side to the second side, the second structural member further including a first protrusion protruding proximate a periphery of the second partial bore on the first side of the second structural member and a second protrusion protruding proximate the periphery of the second partial bore on the second side of the second structural member, wherein the second partial bore is aligned with the first partial bore along a bore axis to define a through-bore, a first engagement member engaged with both the first protrusion of the first structural member and the first protrusion of the second structural member and a second engagement member engaged with both the second protrusion of the first structural member and the second protrusion of the second structural member, wherein the first structural member and the second structural member are clamped between the first engagement member and the second engagement member.

Also disclosed is a method for joining a first structural member to a second structural member, each of the first structural member and the second structural member including a first side, a second side opposite the first side, a partial bore extending from the first side to the second side, a first protrusion protruding proximate a periphery of the partial bore on the first side, and a second protrusion protruding proximate the periphery of the partial bore on the second side. In one example, the disclosed method may include the steps of (1) aligning the partial bore of the first structural member with the partial bore of the second structural member along a bore axis to define a through-bore; (2) positioning a first engagement member into engagement with both the first protrusion of the first structural member and the first protrusion of the second structural member; and (3) positioning a second engagement member into engagement with both the second protrusion of the first structural member and the second protrusion of the second structural member.

In another example, the disclosed method may include the steps of (1) aligning the partial bore of the first structural member with the partial bore of the second structural member along a bore axis to define a through-bore; (2) positioning a first engagement member into engagement with both the first protrusion of the first structural member and the first protrusion of the second structural member; (3)

positioning a second engagement member into engagement with both the second protrusion of the first structural member and the second protrusion of the second structural member; and (4) applying a clamping force to the first engagement member and the second engagement member to clamp the first structural member and the second structural member between the first engagement member and the second engagement member.

Other examples of the disclosed mechanical fastening system and associated structural assembly and method will become apparent from the following detailed description, the accompanying drawings and the appended claims.

BRIEF DESCRIPTION OF THE DRAWINGS

FIG. 2 is a side cross-sectional view, partially exploded, of a portion of a wing of the aircraft of FIG. 1;

FIG. 11 is a cross-sectional view of an example of the disclosed structural assembly being secured by another single-piece threaded mechanical fastening system;

FIG. 12 is a cross-sectional view of an example of the disclosed structural assembly being secured by yet another single-piece threaded mechanical fastening system;

FIG. 14 is a cross-sectional view of an example of the disclosed structural assembly being secured by another mechanical fastening system that uses mechanical deformation to secure the engagement members;

FIG. 15 is a cross-sectional view of an example of the disclosed structural assembly being secured by yet another mechanical fastening system that uses mechanical deformation to secure the engagement members;

FIG. 17 is a cross-sectional view of an example of the disclosed structural assembly being secured by another mechanical fastening system that uses mechanical deformations to secure the structural assembly directly;

FIG. 18 is a cross-sectional view of an example of the disclosed structural assembly being secured by yet another mechanical fastening system that uses mechanical deformations to secure the structural assembly directly;

FIG. 22 is a cross-sectional view of an example of the disclosed structural assembly being secured by another mechanical fastening system connected directly to the shaft;

FIG. 23 is a cross-sectional view of yet another example of the disclosed structural assembly being secured by a mechanical fastening system connected directly to the shaft;

DETAILED DESCRIPTION

Figure 1:
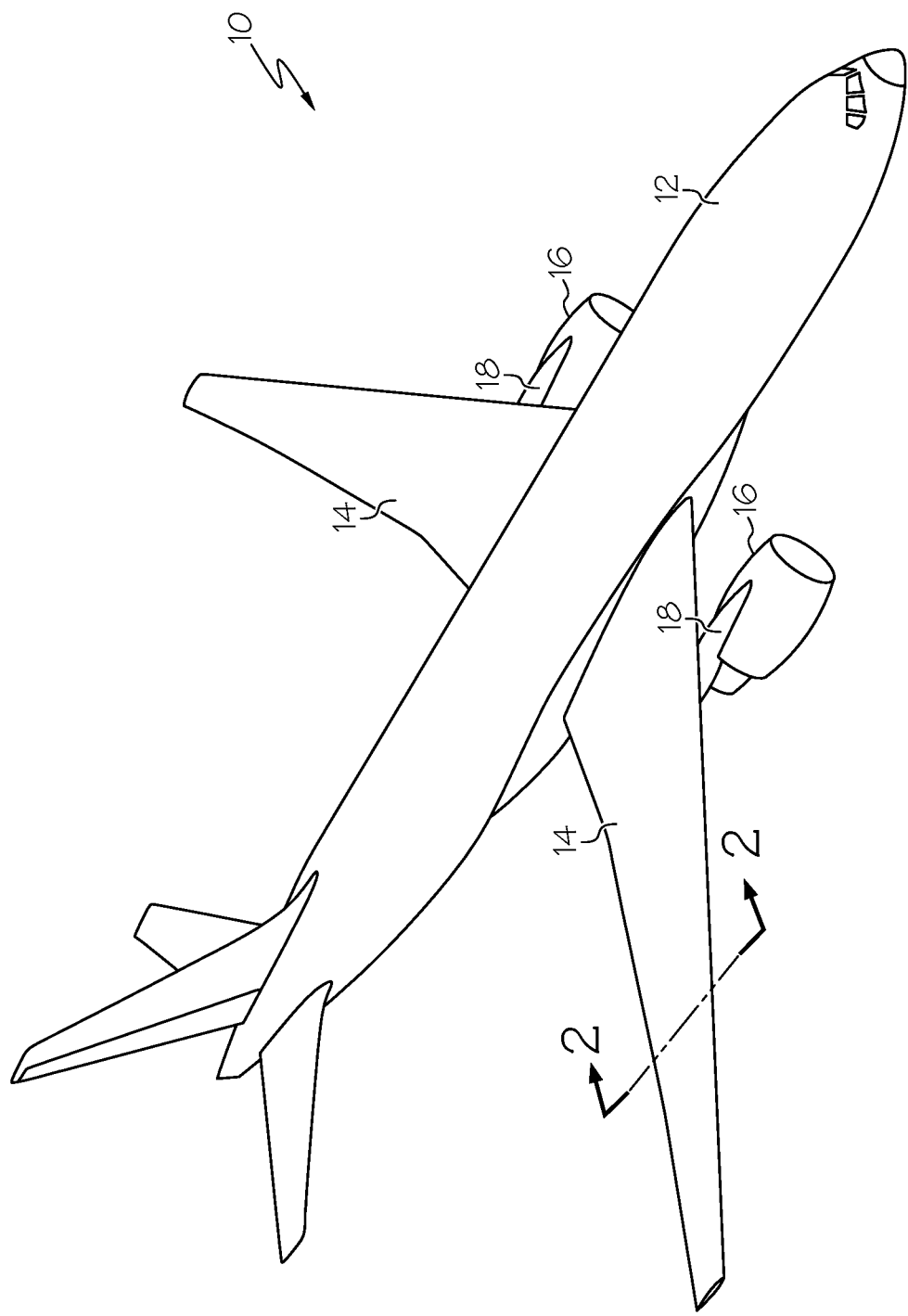
FIG. 1 is a schematic perspective view of an example aircraft incorporating the disclosed mechanical fastening system.

The disclosed mechanical fastening system 100 (FIGS. 3A and 3B) may be incorporated into an aircraft, such as a fixed-wing aircraft 10, as shown in FIG. 1, or a rotary-wing aircraft. Various aircraft, including commercial aircraft, personal aircraft and military aircraft, may benefit from the disclosed mechanical fastening system 100 without departing from the scope of the present disclosure. Various non-aircraft applications, including non-aerospace applications, for the disclosed mechanical fastening system 100 are also contemplated.

Referring to FIG. 1, an aircraft 10 may include a fuselage 12, one or more wings 14 (two wings 14 are shown in FIG. 1) and one or more engines 16 (two engines 16 are shown in FIG. 1). Each wing 14 of the aircraft 10 may be fixedly connected to, and may outwardly extend from, the fuselage 12. Each engine 16 may be connected to (e.g., suspended below) an associated wing 14 by way of a pylon 18.

Referring to FIG. 2, each wing 14 of the aircraft 10 may include ribs 20 (only one rib 20 is shown in FIG. 2), a forward spar 22, an aft spar 24, a first (e.g., upper) skin portion 26 and a second (e.g., lower) skin portion 28. The rib 20 may include a first (e.g., upper) rib portion 30 and a second (e.g., lower) rib portion 32. The first skin portion 26 may be connected to the first rib portion 30 and the second skin portion 28 may be connected to the second rib portion 32. The first rib portion 30 may be connected to the second rib portion 32 using the disclosed mechanical fastening system 100, thereby forming the assembled rib 20.

The forward end 34 of the rib 20 may be connected to the forward spar 22, such as with mechanical fasteners 36, and the aft end 38 of the rib 20 may be connected to the aft spar 24, such as with mechanical fasteners 40. Additionally, a forward control surface 42 (e.g., a slat) may be connected to the forward spar 22 and an aft control surface 44 (e.g., an aileron) may be connection to the aft spar 24. Therefore, the wing 14 may include a wing box 46 defined by the ribs 20, the forward and aft control surfaces 42, 44 and the first and second skin portions 26, 28.

As shown in FIG. 2, the wing 14 may be opened by separating from the wing box 46 the first rib portion 30 and associated first skin portion 26. Such separation may be achieved by disconnecting the first rib portion 30 from the second rib portion 32 by way of the disclosed mechanical fastening system 100. Then, once any work and/or inspection within the wing 14 has been completed, the wing 14 may be closed by joining the first rib portion 30 (and associated first skin portion 26) with the second rib portion 32 by way of the disclosed mechanical fastening system 100.

Figure 3A:
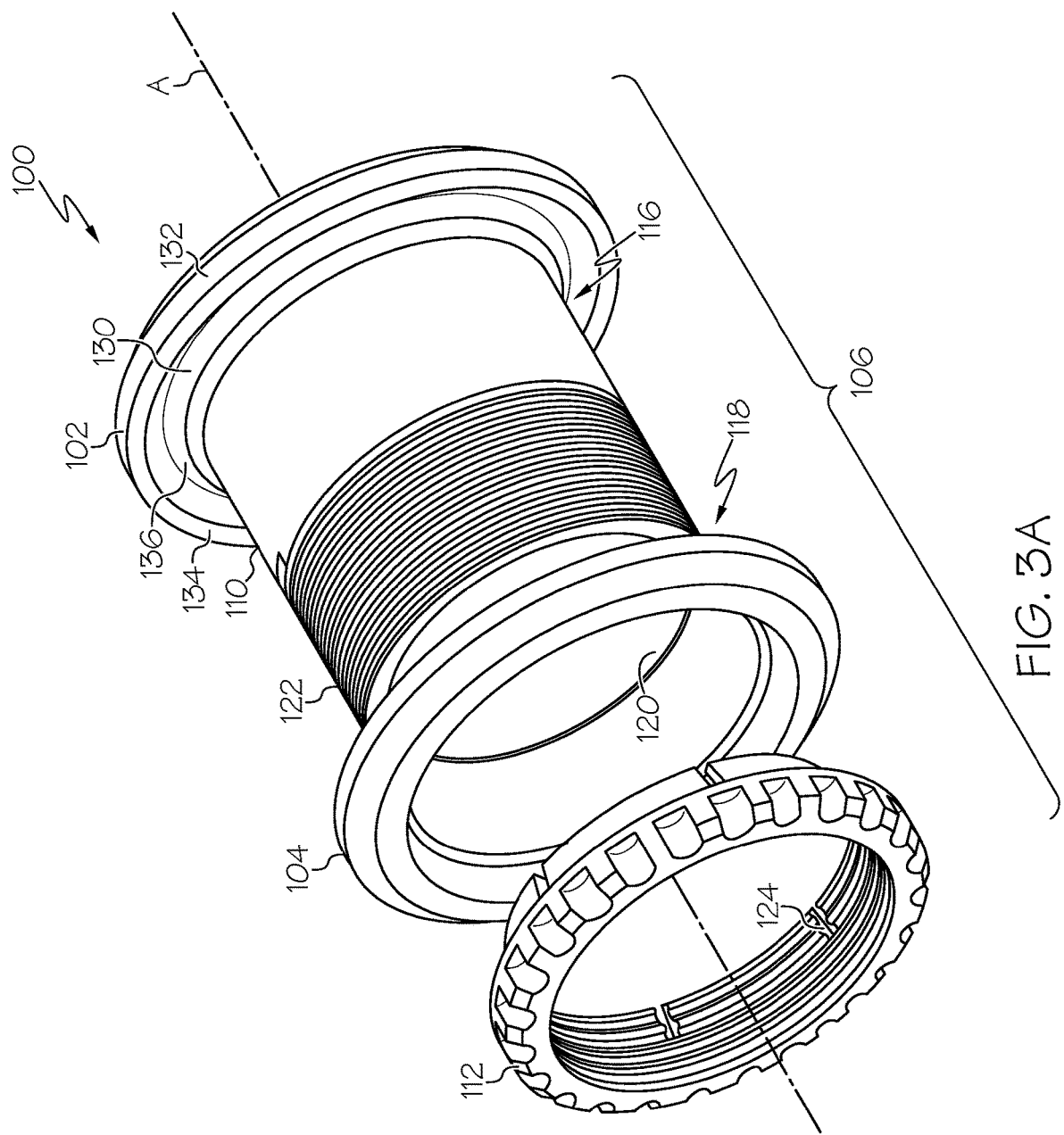
FIGS. 3A and 3B are exploded perspective views of one example of the disclosed mechanical fastening system.
Figure 3B:
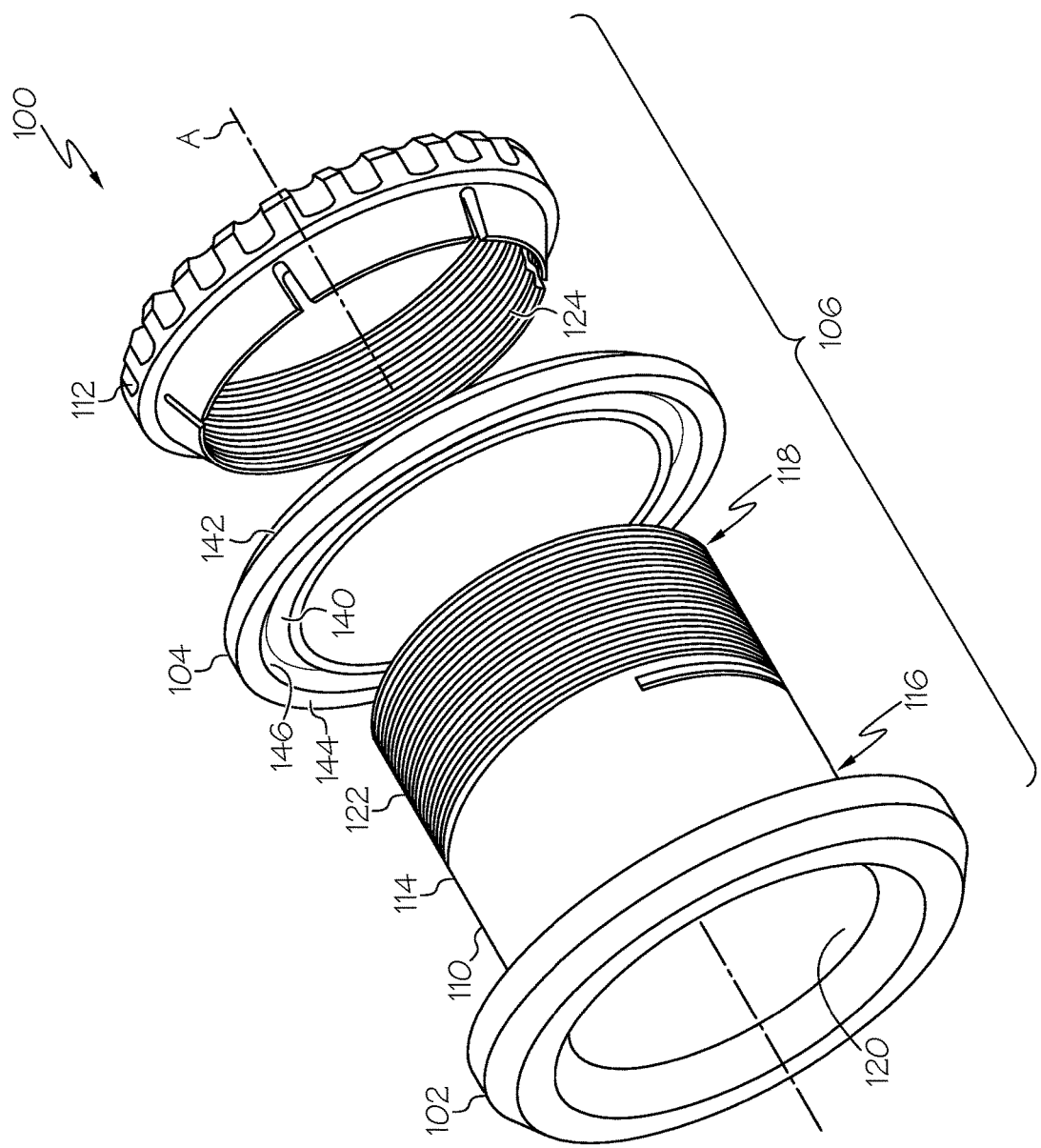

Referring to FIGS. 3A and 3B, one example of the disclosed mechanical fastening system, generally designated 100, may include a first engagement member 102, a second engagement member 104 and a clamping assembly 106. The first engagement member 102 may be aligned with the second engagement member 104 along a longitudinal axis A. The clamping assembly 106 may be engaged with both the first engagement member 102 and the second engagement member 104 to urge the first engagement member 102 axially toward (along longitudinal axis A) the second engagement member 104, thereby facilitating clamping of structural members therebetween, as is described in greater detail herein.

In the example of FIGS. 3A and 3B, the clamping assembly 106 may include a bolt member 110 and a nut member 112. The bolt member 110 may engage the first engagement member 102. The nut member 112 may engage the second engagement member 104, and may be in threaded engagement with the bolt member 110. Therefore, the first engagement member 102 may be axially urged toward the second engagement member 104 by threading the nut member 112 onto the bolt member 110.

Specifically, the bolt member 110 of the clamping assembly 106 may include a shaft 114 that is elongated along the longitudinal axis A, and includes a first end portion 116 and a second end portion 118 longitudinally opposed from the first end portion 116. The shaft 114 of the bolt member 110 may optionally define a bolt member through-bore 120 extending from the first end portion 116 to the second end portion 118. While optional, using a bolt member 110 having a bolt member through-bore 120 may reduce the overall weight of the mechanical fastening system 100 and may provide a route (the bolt member through-bore 120) for running wires, hoses, tubes and the like.

The first engagement member 102 of the disclosed mechanical fastening system 100 may be fixedly connected to the first end portion 116 of the shaft 114 of the bolt member 110 of the clamping assembly 106. For example, as shown in FIGS. 3A and 3B, the first engagement member 102 may be integral with the first end portion 116 of the shaft 114 of the bolt member 110 (e.g., the bolt member 110 and the first engagement member 102 may be formed as a single monolithic body). When the bolt member 110 has a bolt member through-bore 120, the first engagement member 102 may be generally ring-shaped so as not to obstruct the bolt member through-bore 120.

Threads 122 may extend along the shaft 114 of the bolt member 110 from the second end portion 118 of the shaft 114 toward the first end portion 116. The nut member 112 may be provided with corresponding threads 124, and may be threaded onto the shaft 114 of the bolt member 110. Therefore, when the second engagement member 104 of the disclosed mechanical fastening system 100 is coaxially received over the shaft 114 of the bolt member 110 (like a washer), the process of threading the nut member 112 onto the bolt member 110 may bring the nut member 112 into abutting engagement with the second engagement member 104, thereby urging the second engagement member 104 along the shaft 114 toward the first engagement member 102.

While the clamping assembly 106 is shown and described employing a threaded engagement, it is contemplated that clamping assemblies may be used that employ various techniques other than threading (e.g., ratcheting) to effect approximation of the first engagement member 102 with the second engagement member 104. The use of non-thread-based clamping assemblies will not result in a departure from the scope of the present disclosure.

As shown in FIG. 3A, the first engagement member 102 of the disclosed mechanical fastening system 100 may define a recess 130 that axially protrudes into the first engagement member 102 and opens toward the second engagement member 104. In one particular construction, the first engagement member 102 may include a ring-shaped body 132 having an annular surface 134, and the recess 130 may be a groove 136 circumferentially extending along the annular surface 134. While the groove 136 is shown in FIG. 3A as being continuous, it is also contemplated that the groove 136 may be discontinuous (e.g., comprised of two or more spaced groove segments).

While the engagement members 102, 104 are shown in the drawings as having a ring-shaped body 132 having an annular surface 134, engagement members 102, 104 having various other shapes and configurations may be used to accomplish the same function as the illustrated engagement members 102, 104. Variations in engagement member shape will not result in a departure from the scope of the present disclosure.

As shown in FIG. 3B, the second engagement member 104 of the disclosed mechanical fastening system 100 may define a recess 140 that axially protrudes into the second engagement member 104 and opens toward the first engagement member 102. In one particular construction, the second engagement member 104 may include a ring-shaped body 142 having an annular surface 144, and the recess 140 may be a groove 146 circumferentially extending along the annular surface 144. While the groove 146 is shown in FIG. 3B as being continuous, it is also contemplated that the groove 146 may be discontinuous (e.g., comprised of two or more spaced groove segments).

The mechanical fastening system 100 may be assembled by positioning the second engagement member 104 over the shaft 114 of the bolt member 110 and threading the nut member 112 onto the bolt member 110. Once assembled, the first engagement member 102 may be axially aligned with the second engagement member 104 such that the recess 130 (e.g., the groove 136) in the first engagement member 102 faces the recess 140 (e.g., the groove 146) in the second engagement member 104.

The disclosed mechanical fastening system 100 may be used to join two or more structural members 202, 204 (FIG.

Figure 5:
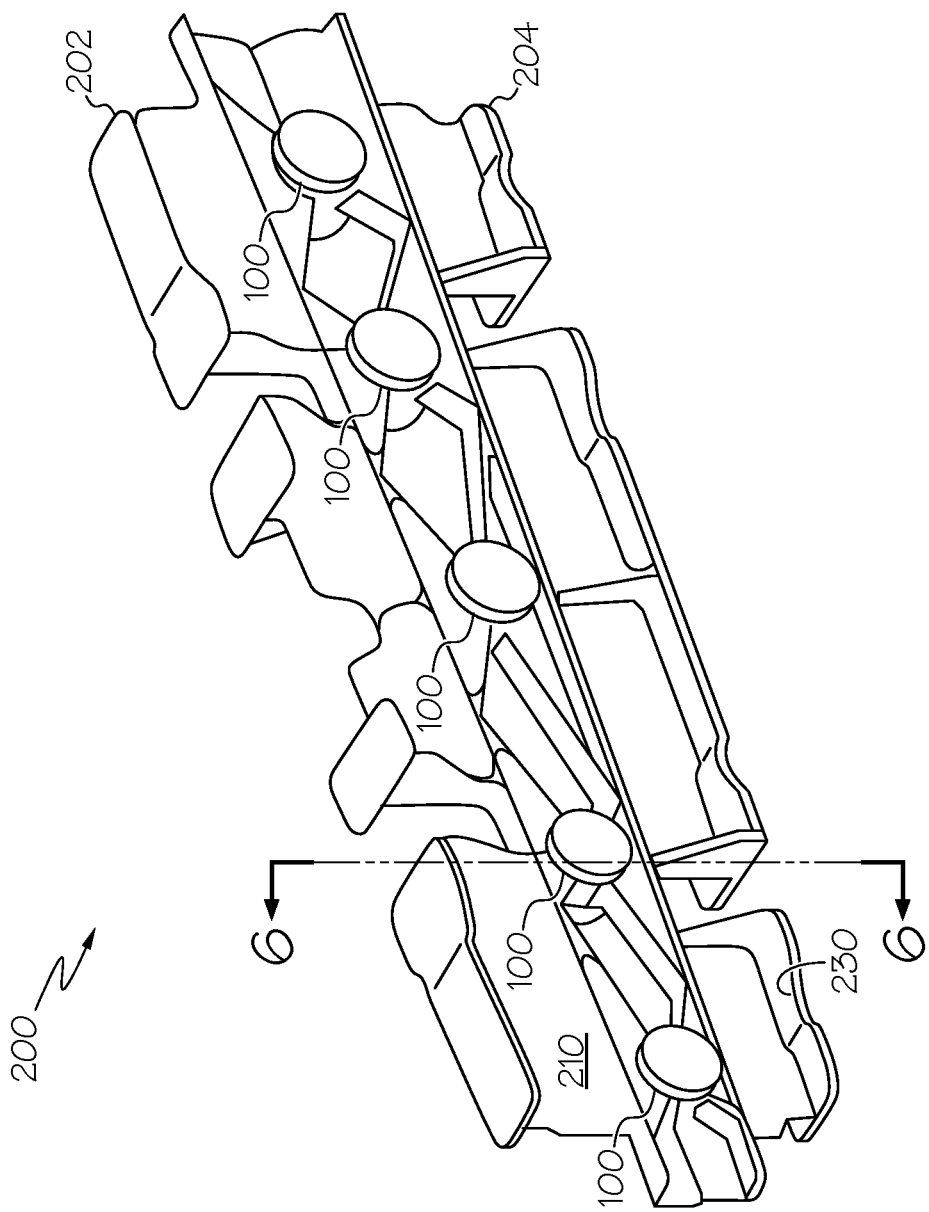
FIG. 5 is a side perspective view of one example of the disclosed structural assembly, which may be formed by joining the structural members of FIG. 4 with the mechanical fastening system of FIGS. 3A and 3B.
Figure 6:
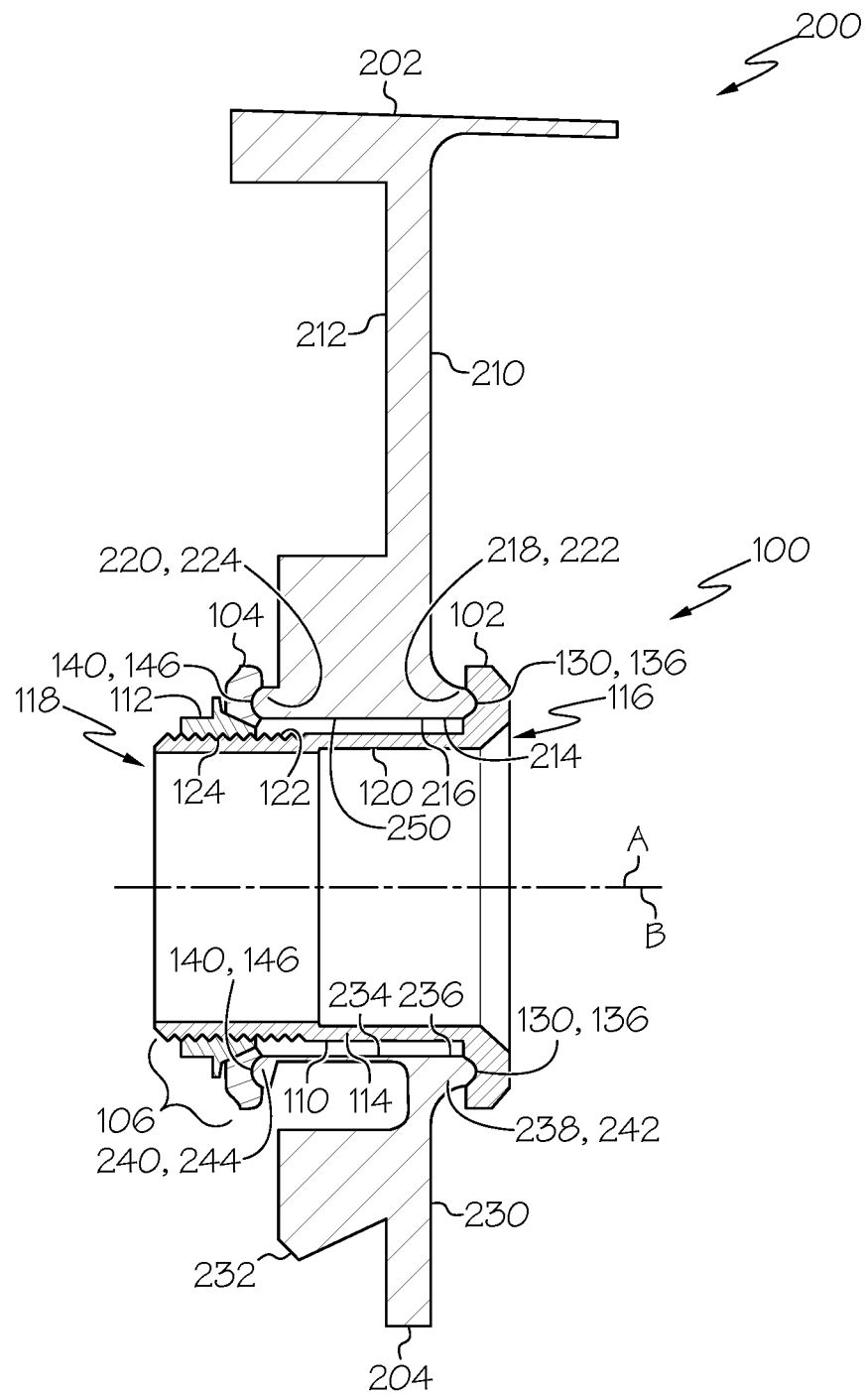
FIG. 6 is a cross-sectional view of the structural assembly of FIG. 5.

4) to yield a structural assembly 200 (FIGS. 5 and 6). Significantly, once the structural members 202, 204 have been joined to form the structural assembly 200, the structural members 202, 204 may later be separated by way of the disclosed mechanical fastening system 100 and, if desired, rejoined by way of the disclosed mechanical fastening system 100.

Referring to FIGS. 5 and 6, one example of the disclosed structural assembly, generally designated 200, may include a first structural member 202, a second structural member 204 and the disclosed mechanical fastening system 100 (five mechanical fastening systems 100 are shown in FIG. 5). The mechanical fastening system 100 may connect the first structural member 202 to the second structural member 204.

Figure 4:
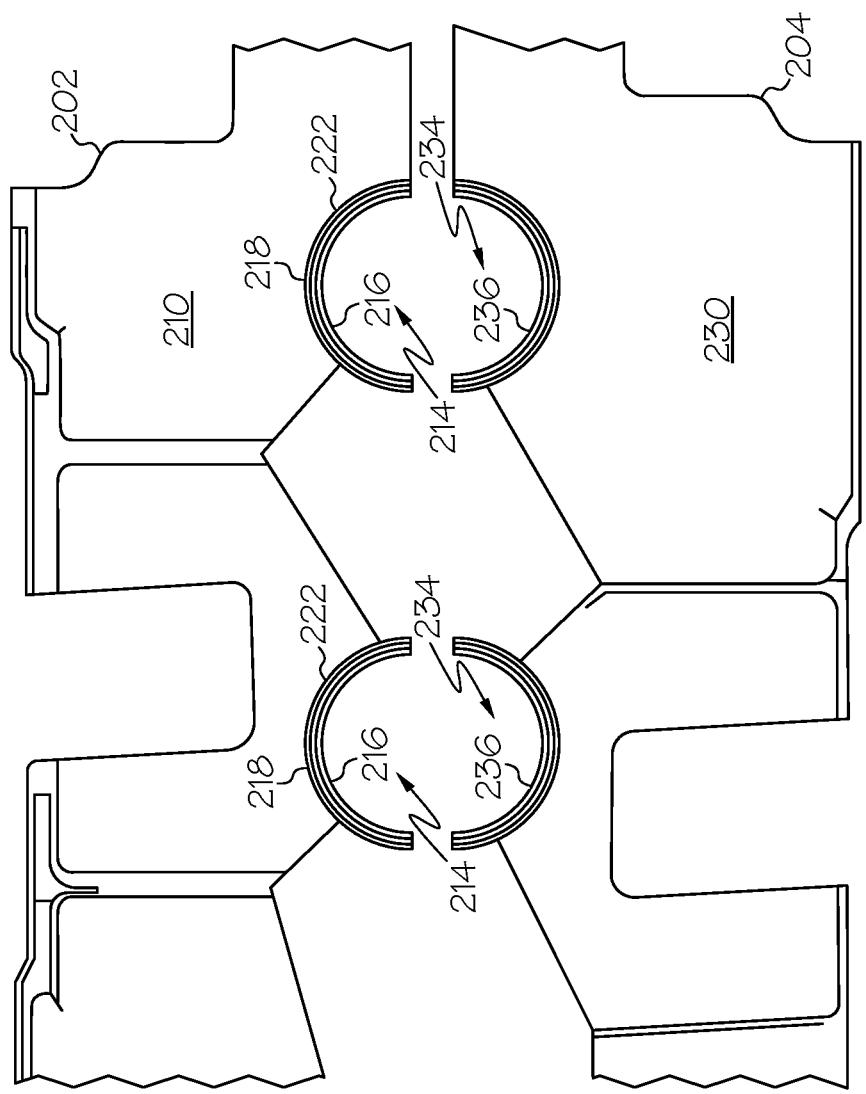
FIG. 4 is a side elevational view of two structural members to be joined by the mechanical fastening system of FIGS. 3A and 3B.

The first structural member 202 of the disclosed structural assembly 200 may include a first side 210 and a second side 212 (FIG. 6) opposite the first side 210. As best shown in FIG. 4, the first structural member 202 may define a first partial bore 214 (two first partial bores 214 are shown in FIG. 4) that extends through the first structural member 202 from the first side 210 to the second side 212. The first partial bore 214 has a periphery 216.

As best shown in FIG. 6, a first protrusion 218 may protrude proximate (at or near) the periphery 216 of the first partial bore 214 on the first side 210 of the first structural member 202. Similarly, a second protrusion 220 may protrude proximate (at or near) the periphery 216 of the first partial bore 214 on the second side 212 of the first structural member 202. The first and second protrusions 218, 220 of the first structural member 202 may be sized and shaped to be received, at least partially, within corresponding recesses 130, 140 of the first and second engagement members 102, 104 of the disclosed mechanical fastening system 100.

In one particular construction, the first protrusion 218 of the first structural member 202 may be a first ridge 222, and the first ridge 222 may extend, either entirely or partially, along the periphery 216 of the first partial bore 214. Similarly, the second protrusion 220 of the first structural member 202 may be a second ridge 224, and the second ridge 224 may extend, either entirely or partially, along the periphery 216 of the first partial bore 214. The first and second ridges 222, 224 of the first structural member 202 may be sized and shaped to be received, at least partially, within corresponding grooves 136, 146 of the first and second engagement members 102, 104 of the disclosed mechanical fastening system 100. For example, the first and second ridges 222, 224 may have a rounded cross-sectional profile, as shown in FIG. 6.

Referring again to FIGS. 5 and 6, the second structural member 204 of the disclosed structural assembly 200 may include a first side 230 and a second side 232 (FIG. 6) opposite the first side 230. As best shown in FIG. 4, the second structural member 204 may define a second partial bore 234 (two second partial bores 234 are shown in FIG. 4) that extends through the second structural member 204 from the first side 230 to the second side 232. The second partial bore 234 has a periphery 236.

As best shown in FIG. 6, a first protrusion 238 may protrude proximate (at or near) the periphery 236 of the second partial bore 234 on the first side 230 of the second structural member 204. Similarly, a second protrusion 240 may protrude proximate (at or near) the periphery 236 of the second partial bore 234 on the second side 232 of the second structural member 204. The first and second protrusions 238, 240 of the second structural member 204 may be sized and shaped to be received, at least partially, within corresponding recesses 130, 140 of the first and second engagement members 102, 104 of the disclosed mechanical fastening system 100.

In one particular construction, the first protrusion 238 of the second structural member 204 may be a third ridge 242, and the third ridge 242 may extend, either entirely or partially, along the periphery 236 of the second partial bore 234. Similarly, the second protrusion 240 of the second structural member 204 may be a fourth ridge 244, and the fourth ridge 244 may extend, either entirely or partially, along the periphery 236 of the second partial bore 234. The third and fourth ridges 242, 244 of the second structural member 204 may be sized and shaped to be received, at least partially, within corresponding grooves 136, 146 of the first and second engagement members 102, 104 of the disclosed mechanical fastening system 100. For example, the third and fourth ridges 242, 244 may have a rounded cross-sectional profile, as shown in FIG. 6.

At this point, those skilled in the art will appreciate that the first structural member 202 of the disclosed structural assembly 200 may be the first rib portion 30 (FIG. 2) of the wing 14 (FIG. 2) of the aircraft 10 (FIG. 1) and the second structural member 204 may be the second rib portion 32, such that the structural assembly 200 is the assembled rib 20. However, this is merely one specific and non-limiting aerospace example. Those skilled in the art will appreciate that various structural members 202, 204 may be joined with the disclosed mechanical fastening system 100, and that the particular size, shape, configuration and function of the structural members 202, 204 is not limiting. Indeed, the disclosed structural assembly 200 may be used in various non-aerospace applications, such as in automotive applications, marine applications and residential/commercial construction applications, without departing from the scope of the present disclosure.

Referring now to FIG. 6, to join the first structural member 202 with the second structural member 204, the first structural member 202 may be positioned relative to the second structural member 204 such that the first partial bore 214 of the first structural member 202 is substantially aligned with the second partial bore 234 of the second structural member 204 along a bore axis B. Therefore, the first structural member 202 and the second structural member 204 may define a through-bore 250 that includes the first partial bore 214 and the second partial bore 234.

While a cylindrical through-bore 250 is shown, through-bores having various shapes may be used without departing from the scope of the present disclosure. A cylindrical through-bore 250 is merely one specific, non-limiting example.

With the through-bore 250 defined, the bolt member 110 of the clamping assembly 106 of the disclosed mechanical fastening system 100 may be inserted through the through-bore 250, thereby bringing the first engagement member 102 into engagement with both the first protrusion 218 of the first structural member 202 and the first protrusion 238 of the second structural member 204. When the first engagement member 102 is engaging the first protrusions 218, 238 of the first and second structural members 202, 204, the first protrusions 218, 238 may be received, at least partially, within the recess 130 of the first engagement member 102.

With the bolt member 110 of the clamping assembly 106 of the disclosed mechanical fastening system 100 extending through the through-bore 250, the second engagement member 104 may be received over the second end portion 118 of the bolt member 110. Then, the nut member 112 may be threaded onto the bolt member 110, thereby bringing the nut member 112 into abutting engagement with the second engagement member 104. As the nut member 112 is threaded onto the bolt member 110, the nut member 112 may urge the second engagement member 104 into engagement with both the second protrusion 220 of the first structural member 202 and the second protrusion 240 of the second structural member 204. When the second engagement member 104 is engaging the second protrusions 220, 240 of the first and second structural members 202, 204, the second protrusions 220, 240 may be received, at least partially, within the recess 140 of the second engagement member 104.

As the nut member 112 of the clamping assembly 106 of the disclosed mechanical fastening system 100 is threaded onto the bolt member 110, the first and second structural members 202, 204 become clamped between the first and second engagement members 102, 104. Because the first engagement member 102 is engaged with the first protrusions 218, 238 of the first and second structural members 202, 204 and the second engagement member 104 is engaged with the second protrusions 220, 240 of the first and second structural members 202, 204, separation of the first structural member 202 relative to the second structural member 204 is inhibited.

Accordingly, the disclosed mechanical fastening system 100 may be used to connect two or more structural members 202, 204. The mechanical fastening system 100 may be self-centering, may be capable of withstanding side and tensions loads, and may be at or near weight neutral, particularly when the bolt member 110 includes a bolt member through-bore 120.

Figure 7:
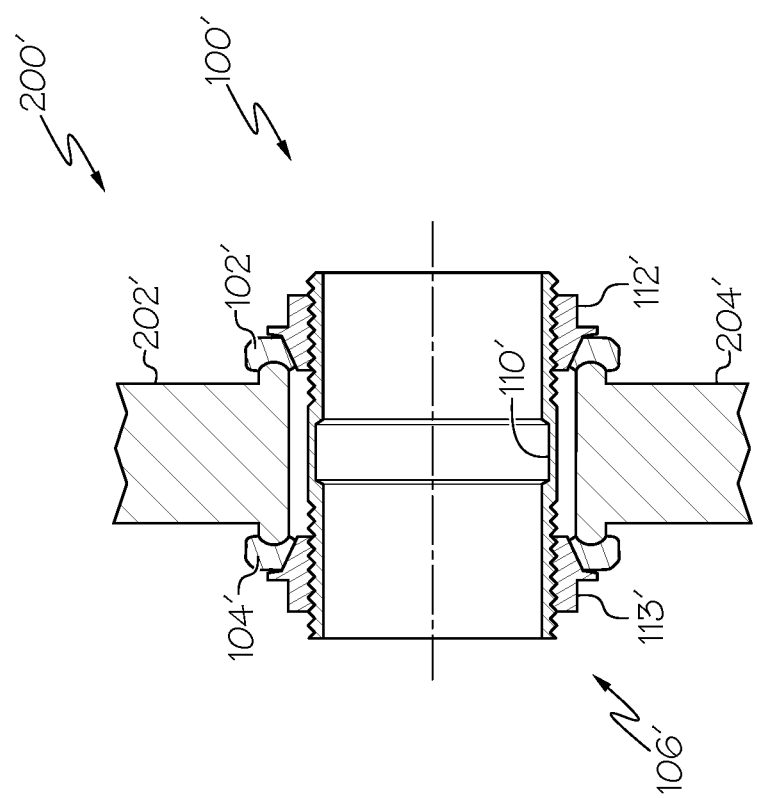
FIG. 7 is a cross-sectional view of another example of the disclosed structural assembly.

Referring to FIG. 7, in one alternative example, the disclosed structural assembly, generally designated 200', may include a first structural member 202', a second structural member 204' and a mechanical fastening system 100'. The mechanical fastening system 100' may include a first engagement member 102', a second engagement member 104' and a clamping assembly 106'. The clamping assembly 106' may be thread-based, and may include a bolt member 110', a first nut member 112' and a second nut member 113'. The first nut member 112' may be in threaded engagement with the bolt member 110', and may be in abutting engagement with the first engagement member 102'. The second nut member 113' may be in threaded engagement with the bolt member 110', and may be in abutting engagement with the second engagement member 104'.

Thus, with structural assembly 200', the first and second structural members 202', 204' are clamped between the first and second engagement members 102', 104' due to threaded engagement of the first and second nut members 112', 113' with the bolt member 110'. This is in contrast to structural assembly 200 (FIG. 6) in which the first engagement member 102 (FIG. 6) is connected to (e.g., integral with) the bolt member 110 (FIG. 6).

Figure 8:
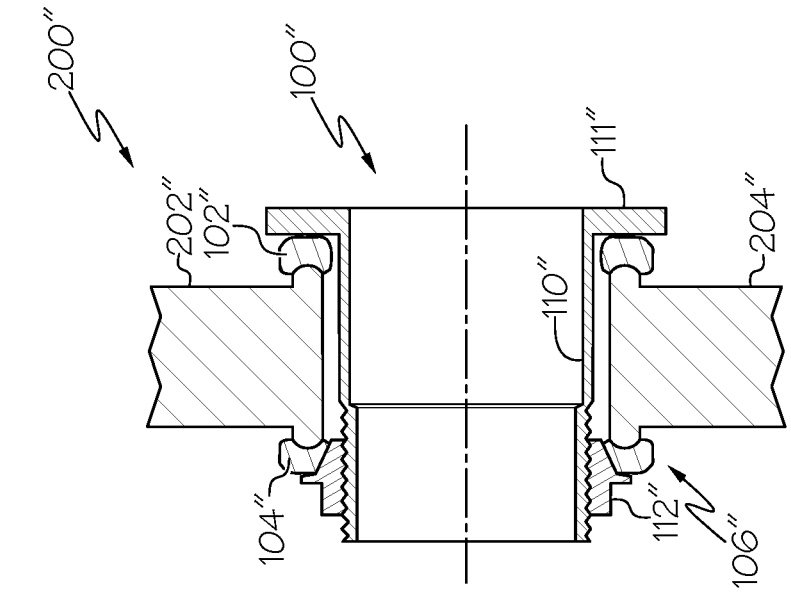
FIG. 8 is a cross-sectional view of yet another example of the disclosed structural assembly.

Referring to FIG. 8, in another alternative example, the disclosed structural assembly, generally designated 200", may include a first structural member 202", a second structural member 204" and a mechanical fastening system 100". The mechanical fastening system 100" may include a first engagement member 102", a second engagement member 104" and a clamping assembly 106". The clamping assembly 106" may be thread-based, and may include a bolt member 110" and a nut member 112". The bolt member 110" may include a flange 111" in abutting engagement with the first engagement member 102". The nut member 112" may be in threaded engagement with the bolt member 110", and may be in abutting engagement with the second engagement member 104". Therefore, the first and second structural members 202", 204" may be clamped between the first and second engagement members 102", 104" by positioning the flange 111" of the bolt member 110" against the first engagement member 102" and threading the nut member 112" into abutting engagement with the second engagement member 104".

Also disclosed is a method for joining a first structural member to a second structural member. Each structural may include a first side, a second side opposite the first side, a partial bore extending from the first side to the second side, a first protrusion extending from a periphery of the partial bore on the first side, and a second protrusion extending from the periphery of the partial bore on the second side.

Figure 9:
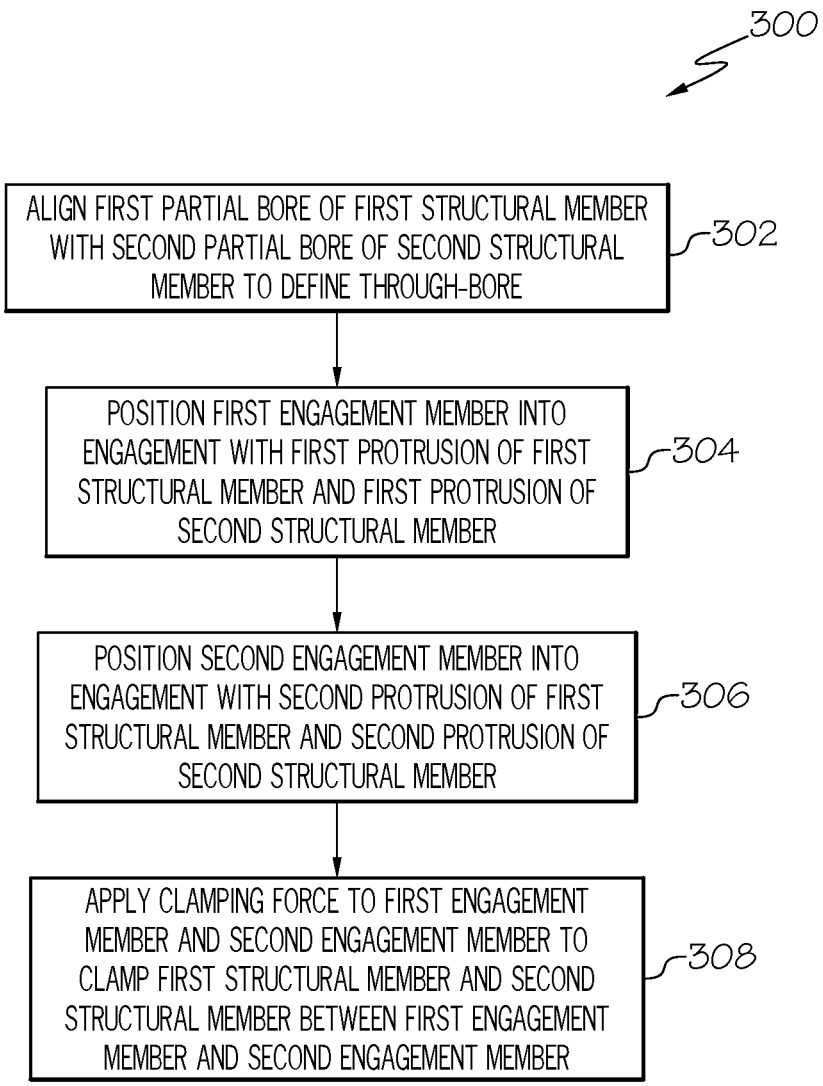
FIG. 9 is a flow diagram depicting one example of the disclosed joining method.

Referring to FIG. 9, one example of the disclosed joining method, generally designated 300, may begin at Block 302 with the step of aligning the partial bore of the first structural member with the partial bore of the second structural member. The partial bores may be aligned along a bore axis to define a through-bore.

At Block 304, a first engagement member may be positioned into engagement with both the first protrusion of the first structural member and the first protrusion of the second structural member. The first engagement member may define one or more recesses (e.g., a circumferential groove), and engagement between the first engagement member and the first protrusions of the first and second structural members may include receiving the first protrusions in the recess of the first engagement member.

At Block 306, a second engagement member may be positioned into engagement with both the second protrusion of the first structural member and the second protrusion of the second structural member. The second engagement member may define one or more recesses (e.g., a circumferential groove), and engagement between the second engagement member and the second protrusions of the first and second structural members may include receiving the second protrusions in the recess of the second engagement member.

At Block 308, a clamping force may be applied to the first engagement member and the second engagement member. The clamping force may clamp the first structural member and the second structural member between the first engagement member and the second engagement member. While a clamping assembly including a bolt member and a nut member is shown and described herein for applying such a clamping force, those skilled in the art will appreciate that various techniques may be used to apply a clamping force to the first engagement member and the second engagement member to clamp the clamp the first structural member and the second structural member between the first engagement member and the second engagement member.

Figure 10:
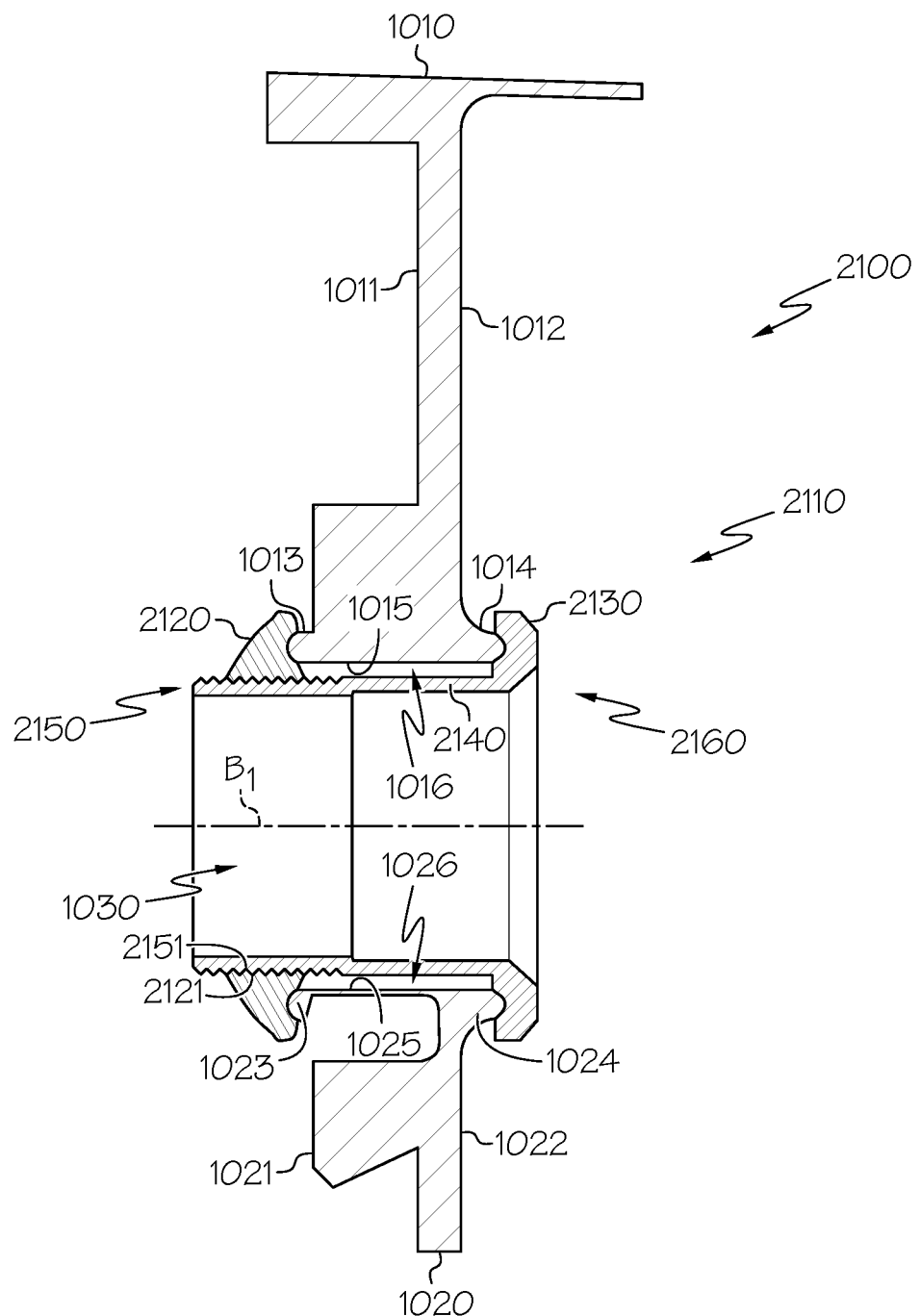
FIG. 10 is a cross-sectional view of an example of the disclosed structural assembly being secured by a single-piece threaded mechanical fastening system.

Referring to FIG. 10, in an alternative example, the disclosed structural assembly, generally designated 2100, includes a first structural member 1010 and a second structural member 1020. A mechanical fastening system 2110 couples the first structural member 1010 with the second structural member 1020.

The first structural member 1010 includes a first side 1011 and a second side 1012 opposite the first side 1011. The first structural member 1010 defines a first partial bore 1015 extending from the first side 1011 to the second side 1012. A first protrusion 1013 protrudes proximate (at or near) the periphery 1016 of the first partial bore 1015 on the first side 1011 of the first structural member 1010. A second protrusion 1014 protrudes proximate the periphery 1016 of the first partial bore 1015 on the second side 1012 of the first structural member 1010.

The second structural member 1020 includes a first side 1021 and a second side 1022 opposite the first side 1021. The second structural member 1020 defines a second partial bore 1025 extending from the first side 1021 to the second side 1022. A first protrusion 1023 protrudes proximate (at or near) the periphery 1026 of the second partial bore 1025 on the first side 1021 of the second structural member 1020. A second protrusion 1024 protrudes proximate the periphery 1026 of the second partial bore 1025 on the second side 1022 of the second structural member 1020. The second partial bore 1025 is aligned with the first partial bore 1015 along a bore axis $B_1$ to define a through-bore 1030.

The mechanical fastening system 2110 includes a first engagement member 2120, a second engagement member 2130 and a shaft 2140. The shaft 2140, which may have a generally circular cross-sectional shape, extends through the through-bore 1030, and includes a first end portion 2150 and a second end portion 2160. The first end portion 2150 may be provided with threads 2151 extending along the shaft 2140 towards the second end portion 2160. The second end portion 2160 may be integral with the second engagement member 2130 (e.g., the second engagement member 2130 and the second end portion 2160 of the shaft 2140 may be formed as a single monolithic body). The first engagement member 2120 may be provided with threads 2121 that correspond with the threads 2151 on the first end portion 2150 of the shaft 2140.

Thus, the first engagement member 2120 may be threaded onto the first end portion 2150 of the shaft 2140 and urged into engagement with both the first protrusion 1013 of the first structural member 1010 and the first protrusion 1023 of the second structural member 1020. Furthermore, the threaded engagement between the first engagement member 2120 and the first end portion 2150 of the shaft 2140 may urge the second engagement member 2130 into engagement with both the second protrusion 1014 of the first structural member 1010 and the second protrusion 1024 of the second structural member 1020. As such, the threaded engagement of the first engagement member 2120 with the shaft 2140 may secure the first structural member 1010 relative to the second structural member 1020.

Referring to FIG. 11, in another alternative example, the disclosed structural assembly, generally designated 2200, includes a first structural member 1010 and a second structural member 1020 (as shown in FIG. 10). A mechanical fastening system 2210 couples the first structural member 1010 with the second structural member 1020. The mechanical fastening system 2210 includes a first engagement member 2220, a second engagement member 2230 and a shaft 2240. The shaft 2240 extends through the through-bore 1030, and includes a first end portion 2250 and a second end portion 2260. The first end portion 2250 may be provided with threads 2251 extending along the shaft 2240 towards the second end portion 2260 and the second end portion 2260 may be provided with threads 2261 extending along the shaft 2240 toward the first end portion 2250. Further, the first engagement member 2220 may be provided with threads 2221 that correspond with the threads on the first end portion 2250 and the second engagement member 2230 may be provided with threads 2231 that correspond with the threads 2261 on the second end portion 2260.

Thus, the first engagement member 2220 may be threaded onto the first end portion 2250 of the shaft 2240 and urged into engagement with both the first protrusion 1013 of the first structural member 1010 and the first protrusion 1023 of the second structural member 1020. The second engagement member 2230 may be threaded onto the second end portion 2260 of the shaft 2240 and urged into engagement with both the second protrusion 1014 of the first structural member 1010 and the second protrusion 1024 of the second structural member 1020. As such, the threaded engagement of the first and second engagement members 2220, 2230 with the shaft 2240 may secure the first structural member 1010 relative to the second structural member 1020.

Referring to FIG. 12, in yet another alternative example, the disclosed structural assembly, generally designated 2300, includes a first structural member 1010 and a second structural member 1020 (as shown in FIG. 10). A mechanical fastening system 2310 couples the first structural member 1010 with the second structural member 1020. The mechanical fastening system 2310 includes a first engagement member 2320, a second engagement member 2330 and a shaft 2340. The shaft 2340 extends through the through-bore 1030, and includes a first end portion 2350 and a second end portion 2360. The first end portion 2350 may be provided with threads 2351 extending along the shaft 2340 towards the second end portion 2360. The first engagement member 2320 may be provided with threads 2321 that correspond with the threads on the first end portion 2350. The second end portion 2360 may include a flange 2370 in abutting engagement with the second engagement member 2330.

Thus, the first engagement member 2320 may be threaded onto the first end portion 2350 of the shaft 2340 and urged into engagement with both the first protrusion 1013 of the first structural member 1010 and the first protrusion 1023 of the second structural member 1020. Furthermore, by positioning the flange 2370 against the second engagement member 2330, the threaded engagement between the first engagement member 2320 and the first end portion 2350 of the shaft 2340 may urge the second engagement member 2330 into engagement with both the second protrusion 1014 of the first structural member 1010 and the second protrusion 1024 of the second structural member 1020. As such, the threaded engagement of the first engagement member 2320 with the shaft 2340 may secure the first structural member 1010 relative to the second structural member 1020.

Referring now to FIGS. 13-28, disclosed are alternative example for a mechanical fastening system that are not thread-based. Nevertheless, those skilled in the art will appreciate that various combinations of threaded and non-threaded structures and assemblies may be employed without departing from the scope of the present disclosure.

Figure 13:
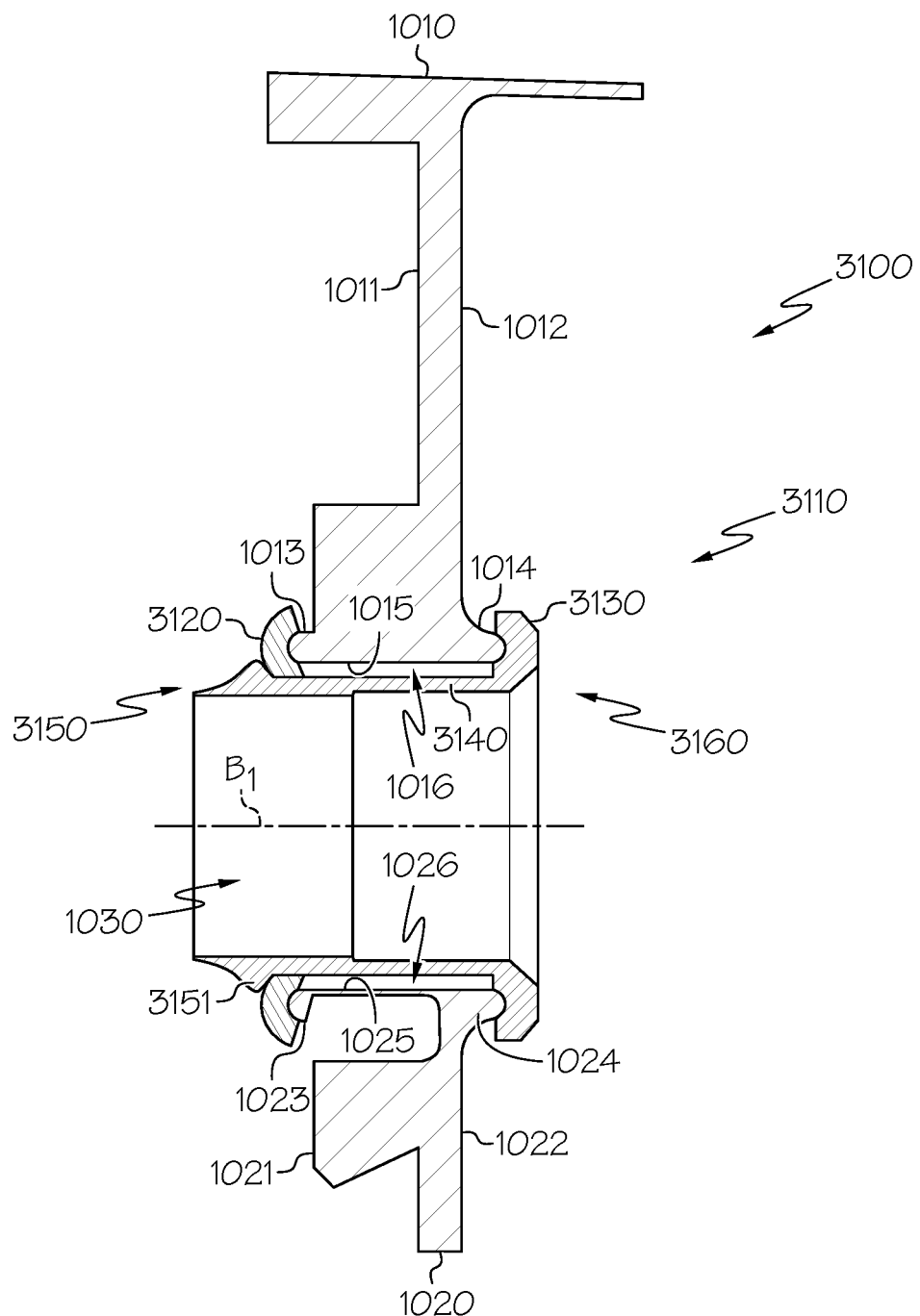
FIG. 13 is a cross-sectional view of an example of the disclosed structural assembly being secured by a mechanical fastening system that uses mechanical deformation to secure the engagement members.

Referring to FIG. 13, in an alternative example, the disclosed structural assembly, generally designated 3100, includes a first structural member 1010 and a second structural member 1020 (as shown in FIG. 10). A mechanical fastening system 3110 couples the first structural member 1010 with the second structural member 1020. The mechanical fastening system 3110 includes a first engagement member 3120, a second engagement member 3130 and a shaft 3140. The shaft 3140 extends through the through-bore 1030, and includes a first end portion 3150 and a second end portion 3160. The first end portion 3150 may be mechanically deformed such that a mechanical deformation 3151 protrudes from the shaft 3140 and abuttingly engages the first engagement member 3120. The second end portion 3160 may be integral with the second engagement member 3130 (e.g., the second engagement member 3130 and the second end portion 3160 of the shaft 3140 may be formed as a single monolithic body).

Thus, the mechanical deformation 3151 may urge the first engagement member 3120 member into engagement with both the first protrusion 1013 of the first structural member 1010 and the first protrusion 1023 of the second structural member 1020. Furthermore, the engagement between the mechanical deformation 3151 and the first engagement member 3120 may urge the second engagement member 3130 into engagement with both the second protrusion 1014 of the first structural member 1010 and the second protrusion 1024 of the second structural member 1020. As such, the engagement of the mechanical deformation 3151 with the first engagement member 3120 may secure the first structural member 1010 relative to the second structural member 1020.

Referring to FIG. 14, in another alternative example, the disclosed structural assembly, generally designated 3200, includes a first structural member 1010 and a second structural member 1020 (as shown in FIG. 10). A mechanical fastening system 3210 couples the first structural member 1010 with the second structural member 1020. The mechanical fastening system 3210 includes a first engagement member 3220, a second engagement member 3230 and a shaft 3240. The shaft 3240 extends through the through-bore 1030, and includes a first end portion 3250 and a second end portion 3260. The first end portion 3250 may be mechanically deformed such that a first mechanical deformation 3251 protrudes from the shaft 3240 and abuttingly engages the first engagement member 3220. The second end portion 3260 may also be mechanically deformed such that a second mechanical deformation 3261 protrudes from the shaft 3240 and abuttingly engages the second engagement member 3230.

Thus, the first mechanical deformation 3251 may urge the first engagement member 3220 into engagement with both the first protrusion 1013 of the first structural member 1010 and the first protrusion 1023 of the second structural member 1020. The second mechanical deformation 3261 may urge the second engagement member 3230 into engagement with both the second protrusion 1014 of the first structural member 1010 and the second protrusion 1024 of the second structural member 1020. As such, the engagement of the first mechanical deformation 3251 with the first engagement member 3220 and the engagement of the second mechanical deformation 3261 with the second engagement member 3230 may secure the first structural member 1010 relative to the second structural member 1020.

Referring to FIG. 15, in yet another alternative example, the disclosed structural assembly, generally designated 3300, includes a first structural member 1010 and a second structural member 1020 (as shown in FIG. 10). A mechanical fastening system 3310 couples the first structural member 1010 with the second structural member 1020. The mechanical fastening system 3310 includes a first engagement member 3320, a second engagement member 3330 and a shaft 3340. The shaft 3340 extends through the through-bore 1030, and includes a first end portion 3350 and a second end portion 3360. The first end portion 3350 may be mechanically deformed such that a mechanical deformation 3351 protrudes from the shaft 3340 and abuttingly engages the first engagement member 3320. The second end portion 3360 may include a flange 3370 in abutting engagement with the second engagement member 3330.

Thus, the mechanical deformation 3351 may urge the first engagement member 3320 into engagement with both the first protrusion 1013 of the first structural member 1010 and the first protrusion 1023 of the second structural member 1020. Furthermore, by positioning the flange 3370 against the second engagement member 3330, the engagement between the mechanical deformation 3351 and the first engagement member 3320 may urge the second engagement member 3330 into engagement with both the second protrusion 1014 of the first structural member 1010 and the second protrusion 1024 of the second structural member 1020. As such, the engagement of the mechanical deformation 3351 with the first engagement member 3320 may secure the first structural member 1010 relative to the second structural member 1020.

Figure 16:
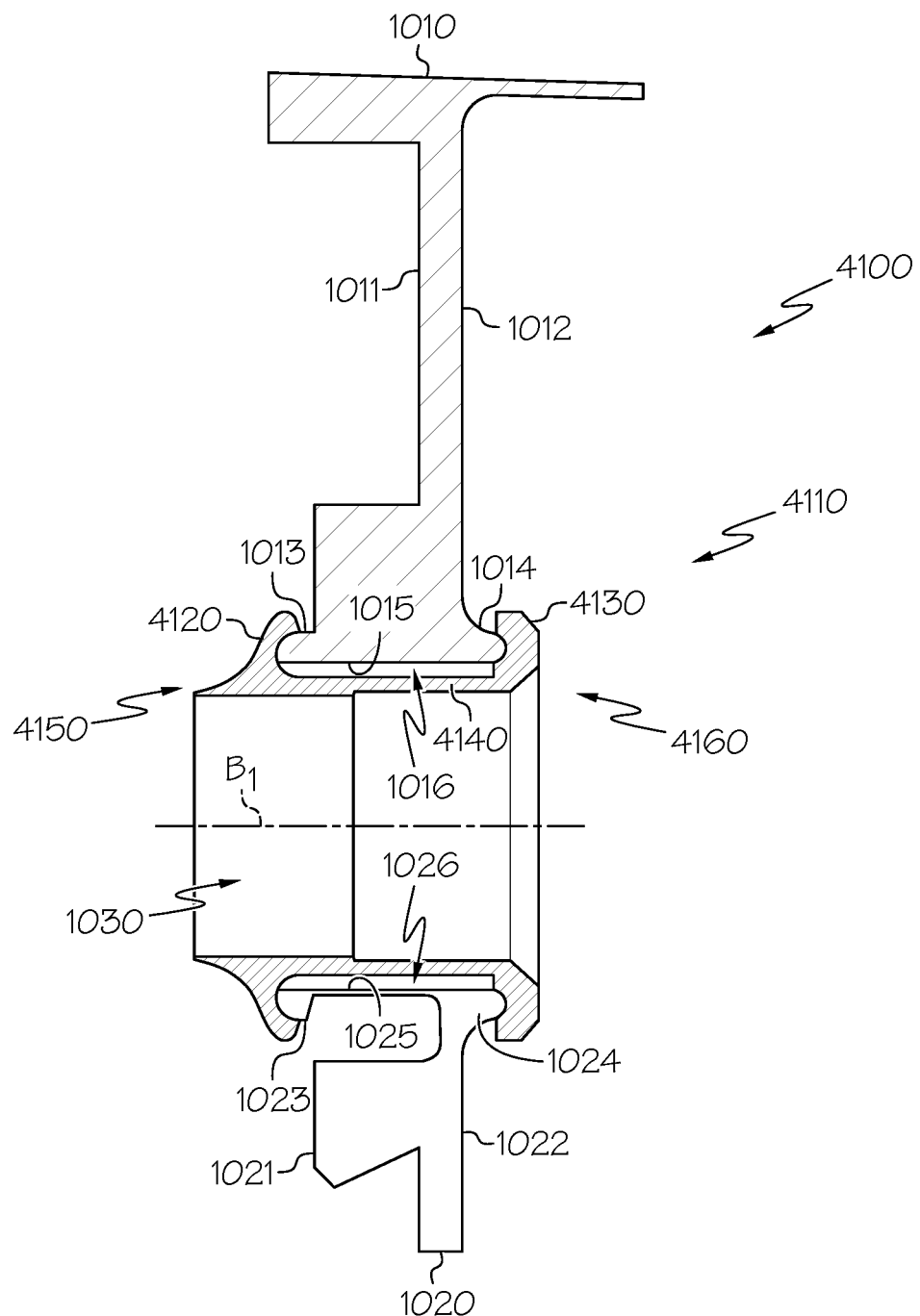
FIG. 16 is a cross-sectional view of an example of the disclosed structural assembly being secured by a mechanical fastening system that uses mechanical deformations to secure the structural assembly directly.

Referring to FIG. 16, in an another alternative example, the disclosed structural assembly, generally designated 4100, includes a first structural member 1010 and a second structural member 1020 (as shown in FIG. 10). A mechanical fastening system 4110 couples the first structural member 1010 with the second structural member 1020. The mechanical fastening system 4110 includes a first engagement member 4120, a second engagement member 4130 and a shaft 4140. The shaft 4140 extends through the through-bore 1030, and includes a first end portion 4150 and a second end portion 4160. The first end portion 4150 may be mechanically deformed such that a mechanical deformation is created that protrudes from the shaft 4140 and engages both the first protrusion 1013 of the first structural member 1010 and the first protrusion 1023 of the second structural member 1020. This mechanical deformation becomes the first engagement member 4120. The second end portion 4160 may be integral with the second engagement member 4130 (e.g., the second engagement member 4130 and the second end portion 4160 of the shaft 4140 may be formed as a single monolithic body).

Thus, by mechanically deforming the first end portion 4150, the first engagement member 4120 may be created and thereby urged into engagement with both the first protrusion 1013 of the first structural member 1010 and the first protrusion 1023 of the second structural member 1020. Furthermore, mechanically deforming the first end portion 4150 may urge the second engagement member 4130 into engagement with both the second protrusion 1014 of the first structural member 1010 and the second protrusion 1024 of the second structural member 1020. As such, mechanically deforming the first end portion 4150 may secure the first structural member 1010 relative to the second structural member 1020.

Referring to FIG. 17, in another alternative example, the disclosed structural assembly, generally designated 4200, includes a first structural member 1010 and a second structural member 1020 (as shown in FIG. 10). A mechanical fastening system 4210 couples the first structural member 1010 with the second structural member 1020. The mechanical fastening system 4210 includes a first engagement member 4220, a second engagement member 4230 and a shaft 4240. The shaft 4240 extends through the through-bore 1030, and includes a first end portion 4250 and a second end portion 4260. The first end portion 4250 may be mechanically deformed such that a first mechanical deformation is created that protrudes from the shaft 4240 and engages both the first protrusion 1013 of the first structural member 1010 and the first protrusion 1023 of the second structural member 1020. This first mechanical deformation becomes the first engagement member 4220. The second end portion 4260 may also be mechanically deformed such that a second mechanical deformation is created that protrudes from the shaft 4240 and engages both the second protrusion 1014 of the first structural member 1010 and the second protrusion 1024 of the second structural member 1020. This second mechanical deformation becomes the second engagement member 4230.

Thus, by mechanically deforming the first end portion 4250, the first engagement member 4220 may be created and thereby urged into engagement with both the first protrusion 1013 of the first structural member 1010 and the first protrusion 1023 of the second structural member 1020. Furthermore, by mechanically deforming the second end portion 4260, the second engagement member 4230 may be created and thereby urged into engagement with both the second protrusion 1014 of the first structural member 1010 and the second protrusion 1024 of the second structural member 1020. As such, mechanically deforming both the first end portion 4250 and the second end portion 4260 may secure the first structural member 1010 relative to the second structural member 1020.

Referring to FIG. 18, in yet another alternative example, the disclosed structural assembly, generally designated 4300, includes a first structural member 1010 and a second structural member 1020 (as shown in FIG. 10). A mechanical fastening system 4310 couples the first structural member 1010 with the second structural member 1020. The mechanical fastening system 4310 includes a first engagement member 4320, a second engagement member 4330 and a shaft 4340. The shaft 4340 extends through the through-bore 1030, and includes a first end portion 4350 and a second end portion 4360. The first end portion 4350 may be mechanically deformed such that a mechanical deformation is created that protrudes from the shaft 4340 and engages both the first protrusion 1013 of the first structural member 1010 and the first protrusion 1023 of the second structural member 1020. This mechanical deformation becomes the first engagement member 4320. The second end portion 4360 may include a flange 4370 in abutting engagement with the second engagement member 4330.

Thus, by mechanically deforming the first end portion 4350, the first engagement member 4320 may be created and thereby urged into engagement with both the first protrusion 1013 of the first structural member 1010 and the first protrusion 1023 of the second structural member 1020. Furthermore, by positioning the flange 4370 against the second engagement member 4330, mechanically deforming the first end portion 4350 may urge the second engagement member 4330 into engagement with both the second protrusion 1014 of the first structural member 1010 and the second protrusion 1024 of the second structural member 1020. As such, mechanically deforming the first end portion 4350 may secure the first structural member 1010 relative to the second structural member 1020.

Referring to the examples described in FIGS. 13-18, those skilled in the art will appreciate that mechanical deformations may be created using a variety of methods including cold swaging, hot swaging, indenting, deep drawing and shearing. Therefore, the mechanical deformation may be a swage. Those skilled in the art will also appreciate that other methods of creating mechanical deformations may be used without departing from the scope of the present disclosure.

Figure 19:
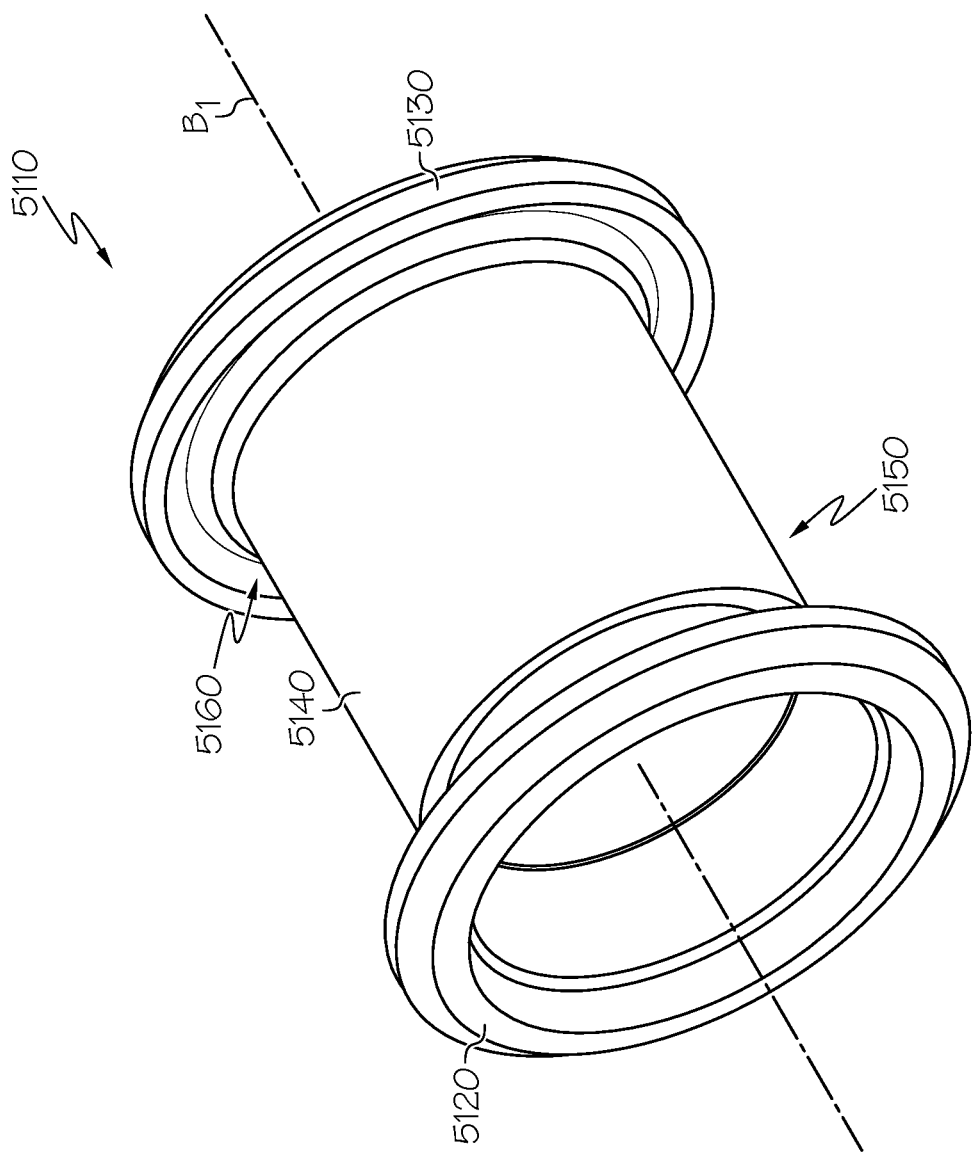
FIG. 19 is an exploded perspective view of an example of the disclosed mechanical fastening system that connects directly to the shaft.
Figure 20:
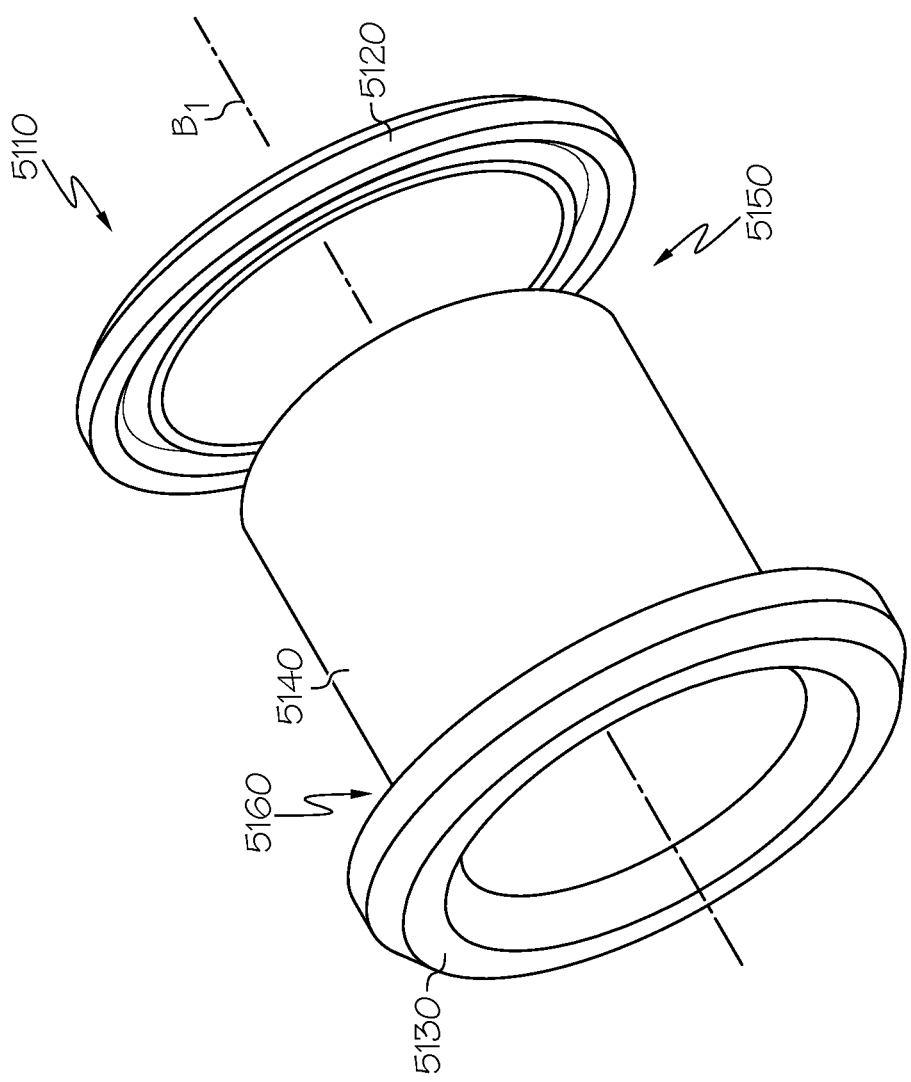
FIG. 20 is a rear exploded perspective view of an example of the disclosed mechanical fastening system that connects directly to the shaft.
Figure 21:
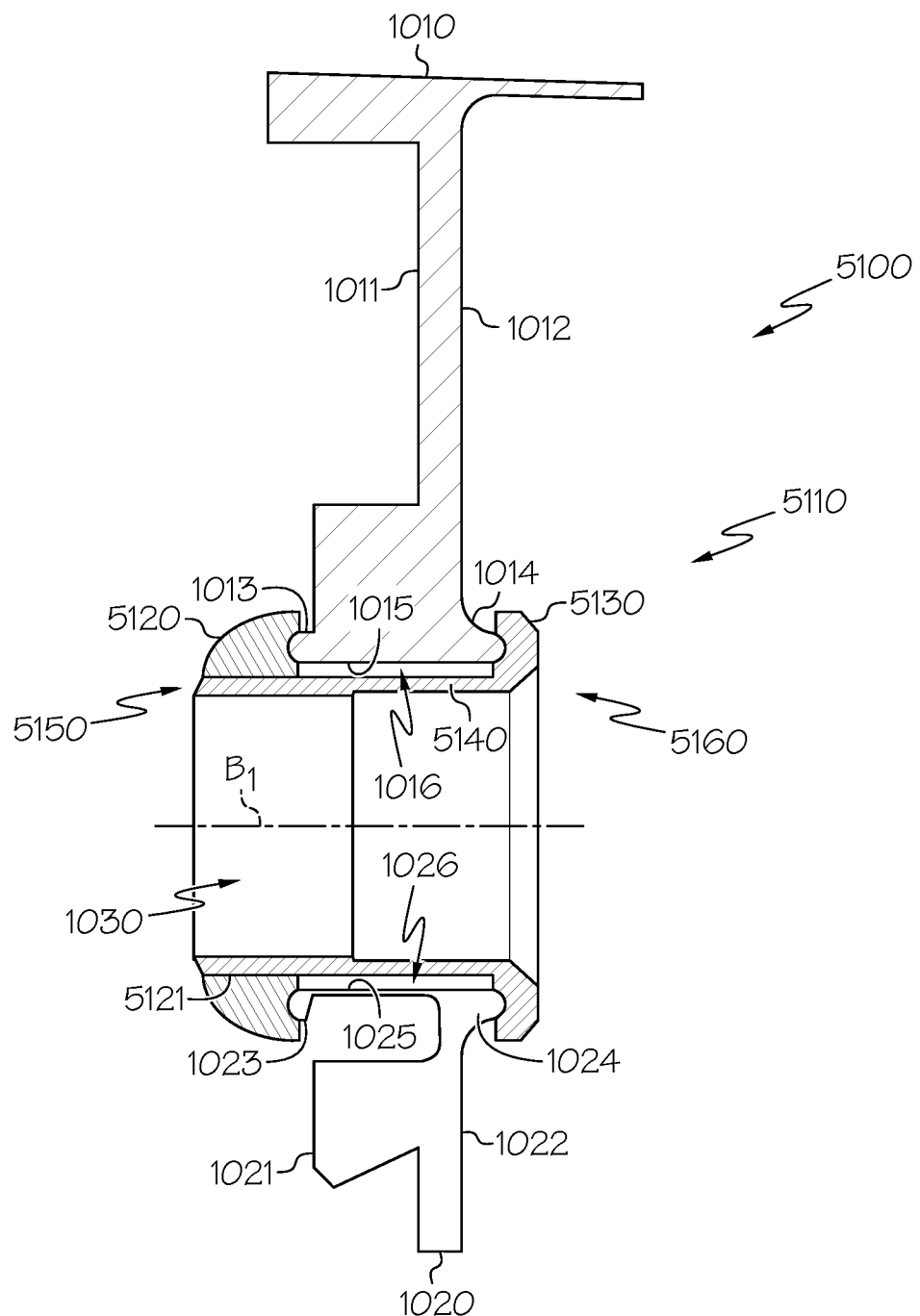
FIG. 21 is a cross-sectional view of an example of the disclosed structural assembly being secured by a mechanical fastening system connected directly to the shaft.

Referring to FIGS. 19, 20 and 21, in an alternative example, the disclosed structural assembly, generally designated 5100, includes a first structural member 1010 and a second structural member 1020 (as shown in FIG. 10). A mechanical fastening system 5110 couples the first structural member 1010 with the second structural member 1020. The mechanical fastening system 5110 includes a first engagement member 5120, a second engagement member 5130 and a shaft 5140. The shaft 5140 extends through the through-bore 1030, and includes a first end portion 5150 and a second end portion 5160. The first engagement member 5120 may be connected to the first end portion 5150 of the shaft 5140. This connection 5121 may be at least one of a joint, adhesive bond and an interference fit. The second end portion 5160 may be integral with the second engagement member 5130 (e.g., the second engagement member 5130 and the second end portion 5160 of the shaft 5140 may be formed as a single monolithic body).

Thus, the first and second structural members 1010, 1020 may be positioned between the first and second engagement members 5120, 5130 such that the first engagement member 5120 engages both the first protrusion 1013 of the first structural member 1010 and the first protrusion 1023 of the second structural member 1020, and the second engagement member 5130 engages both the second protrusion 1014 of the first structural member 1010 and the second protrusion 1024 of the second structural member 1020. Once positioned, the first engagement member 5120 may be connected to the first end portion 5150 such that the position of the first engagement member 5120 is fixed along the shaft 5140. As such, the connection 5121 between the first engagement member 5120 and the first end portion 5150 may secure the first structural member 1010 relative to the second structural member 1020.

Referring to FIG. 22, in another alternative example, the disclosed structural assembly, generally designated 5200, includes a first structural member 1010 and a second structural member 1020 (as shown in FIG. 10). A mechanical fastening system 5210 couples the first structural member 1010 with the second structural member 1020. The mechanical fastening system 5210 includes a first engagement member 5220, a second engagement member 5230 and a shaft 5240. The shaft 5240 extends through the through-bore 1030, and includes a first end portion 5250 and a second end portion 5260. The first engagement member 5220 may be connected to the first end portion 5250 of the shaft 5240. This first connection 5221 may be at least one of a joint, adhesive bond and an interference fit. The second engagement member 5230 may be connected to the second end portion 5260 of the shaft 5240. This second connection 5231 may be at least one of a joint, adhesive bond and an interference fit.

Thus, the first and second structural members 1010, 1020 may be positioned between the first and second engagement members 5220, 5230 such that the first engagement member 5220 engages both the first protrusion 1013 of the first structural member 1010 and the first protrusion 1023 of the second structural member 1020, and the second engagement member 5230 engages both the second protrusion 1014 of the first structural member 1010 and the second protrusion 1024 of the second structural member 1020. Once positioned, the first engagement member 5220 may be connected to the first end portion 5250 and the second engagement member 5230 may be connected to the second end portion 5260 such that the positions of the first and second engagement members 5220, 5230 are fixed along the shaft 5240. As such, the connections 5221, 5231 between the first and second engagement members 5220, 52230 with the first and second end portions 5250, 5260 may secure the first structural member 1010 relative to the second structural member 1020.

Referring to FIG. 23, in yet another alternative example, the disclosed structural assembly, generally designated 5300, includes a first structural member 1010 and a second structural member 1020 (as shown in FIG. 10). A mechanical fastening system 5310 couples the first structural member 1010 with the second structural member 1020. The mechanical fastening system 5310 includes a first engagement member 5320, a second engagement member 5330 and a shaft 5340. The shaft 5340 extends through the through-bore 1030, and includes a first end portion 5350 and a second end portion 5360. The first engagement member 5320 may be connected to the first end portion 5350 of the shaft 5340. This connection 5321 may be at least one of a joint, adhesive bond and an interference fit. The second end portion 5360 may include a flange 5370 in abutting engagement with the second engagement member 5330.

Thus, by positioning the flange 5370 against the second engagement member 5330, the first and second structural members 1010, 1020 may be positioned between the first and second engagement members 5320, 5330 such that the first engagement member 5320 engages both the first protrusion 1013 of the first structural member 1010 and the first protrusion 1023 of the second structural member 1020, and the second engagement member 5330 engages both the second protrusion 1014 of the first structural member 1010 and the second protrusion 1024 of the second structural member 1020. Once positioned, the first engagement member 5320 may be connected to the first end portion 5350 such that the position of the first engagement member 5320 is fixed along the shaft 5340. As such, the connection 5321 between the first engagement member 5320 and the first end portion 5350 may secure the first structural member 1010 relative to the second structural member 1020.

Referring to the examples disclosed in FIGS. 19-23, those skilled in the art will appreciate that there are several suitable methods for connecting engagement members to a shaft. For example, joints may be created by welding, braising, soldering, local heat melting, and/or vibration melting. Adhesion bonds may be created using resins, acrylics, and/or epoxies. Interference fits may be created by thermal and/or friction interference fitting. Those skilled in the art will also appreciate that other methods for connecting may be used without departing from the scope of the present disclosure.

Figure 24:
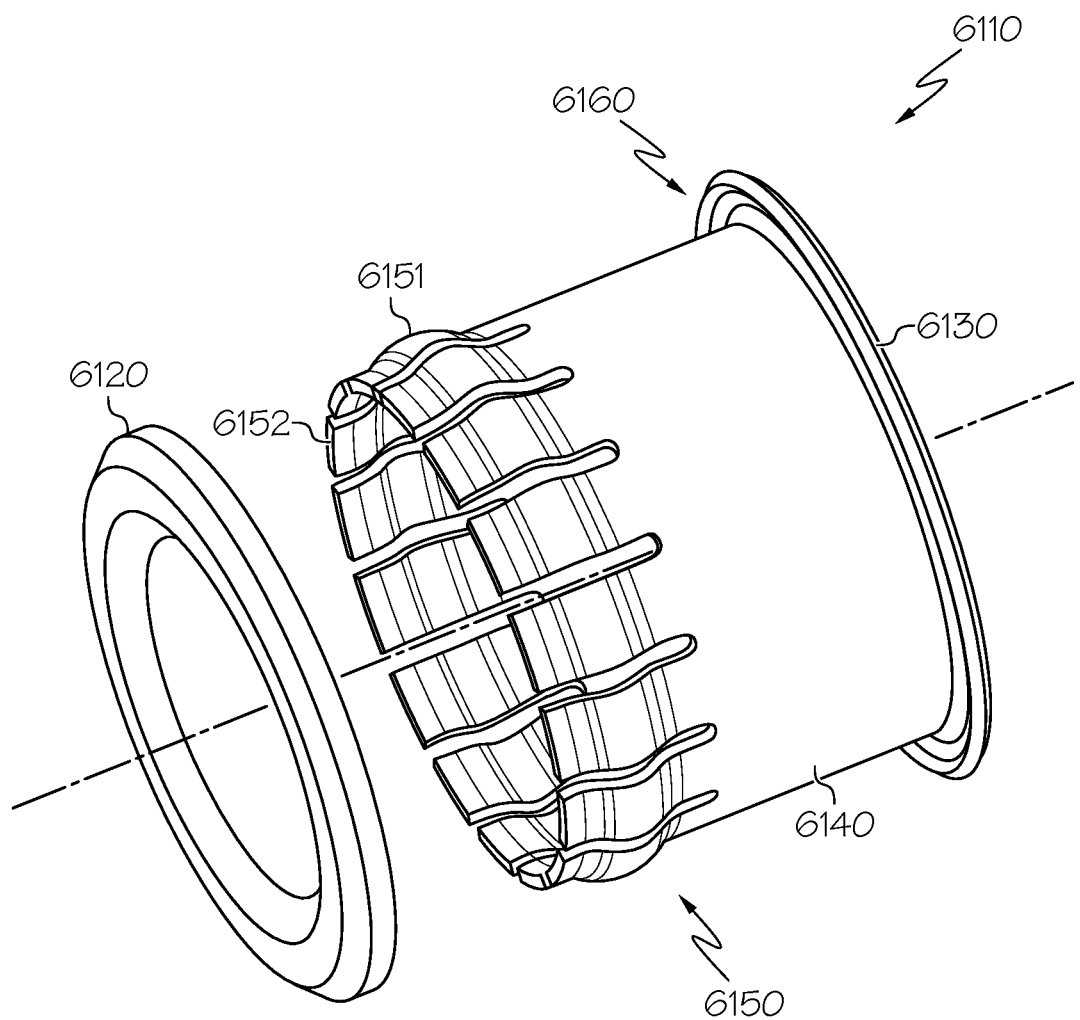
FIG. 24 is an exploded perspective view of an example of the disclosed structural assembly being secured by a "click" mechanical fastening system.
Figure 25:
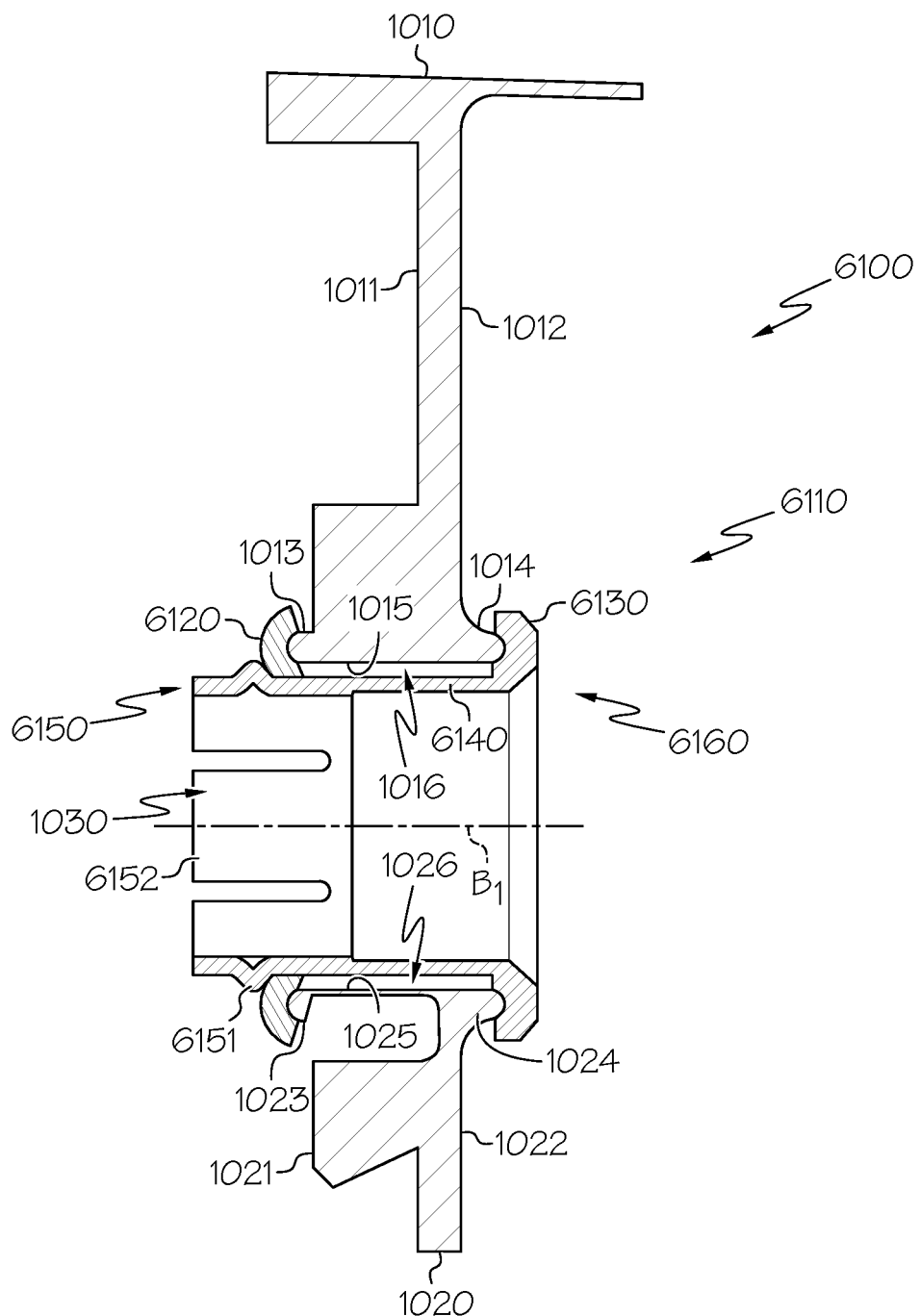
FIG. 25 is a cross-sectional view of an example of the disclosed structural assembly being secured by a "click" mechanical fastening system.

Referring to FIGS. 24 and 25, in an alternative example, the disclosed structural assembly, generally designated 6100, includes a first structural member 1010 and a second structural member 1020 (as shown in FIG. 10). A mechanical fastening system 6110 couples the first structural member 1010 with the second structural member 1020. The mechanical fastening system 6110 includes a first engagement member 6120, a second engagement member 6130 and a shaft 6140. The shaft 6140 extends through the through-bore 1030, and includes a first end portion 6150 and a second end portion 6160. The first end portion 6150 may include a protrusion 6151 that extends radially outward and abuttingly engages the first engagement member 6120. This protrusion 6151 may also be defined by a plurality of discontinuous interfacing fingers 6152. The second end portion 6160 may be integral with the second engagement member 6130 (e.g., the second engagement member 6130 and the second end portion 6160 of the shaft 6140 may be formed as a single monolithic body).

Thus, the first engagement member 6120 may be moved along the shaft 6140 toward the second engagement member 6130 such that it mechanically deforms the interfacing fingers 6152 of the protrusion 6151 inwards. Then, once the first engagement member 6120 has moved past the outermost radial point of the protrusion 6151, the interfacing fingers 6152 may deform back towards their original configuration such that the protrusion 6151 abuttingly engages the first engagement member 6120 and urges it into engagement with both the first protrusion 1013 of the first structural member 1010 and the first protrusion 1023 of the second structural member 1020 (e.g., the first engagement member 6120 "clicks" into place"). Furthermore, the abutting engagement of the protrusion 6151 with the first engagement member 6120 may urge the second engagement member 6130 into engagement with both the second protrusion 1014 of the first structural member 1010 and the second protrusion 1024 of the second structural member 1020. As such, by "clicking" the first engagement member 6120 into place, the first structural member 1010 may be secured relative to the second structural member 1020.

Figure 26:
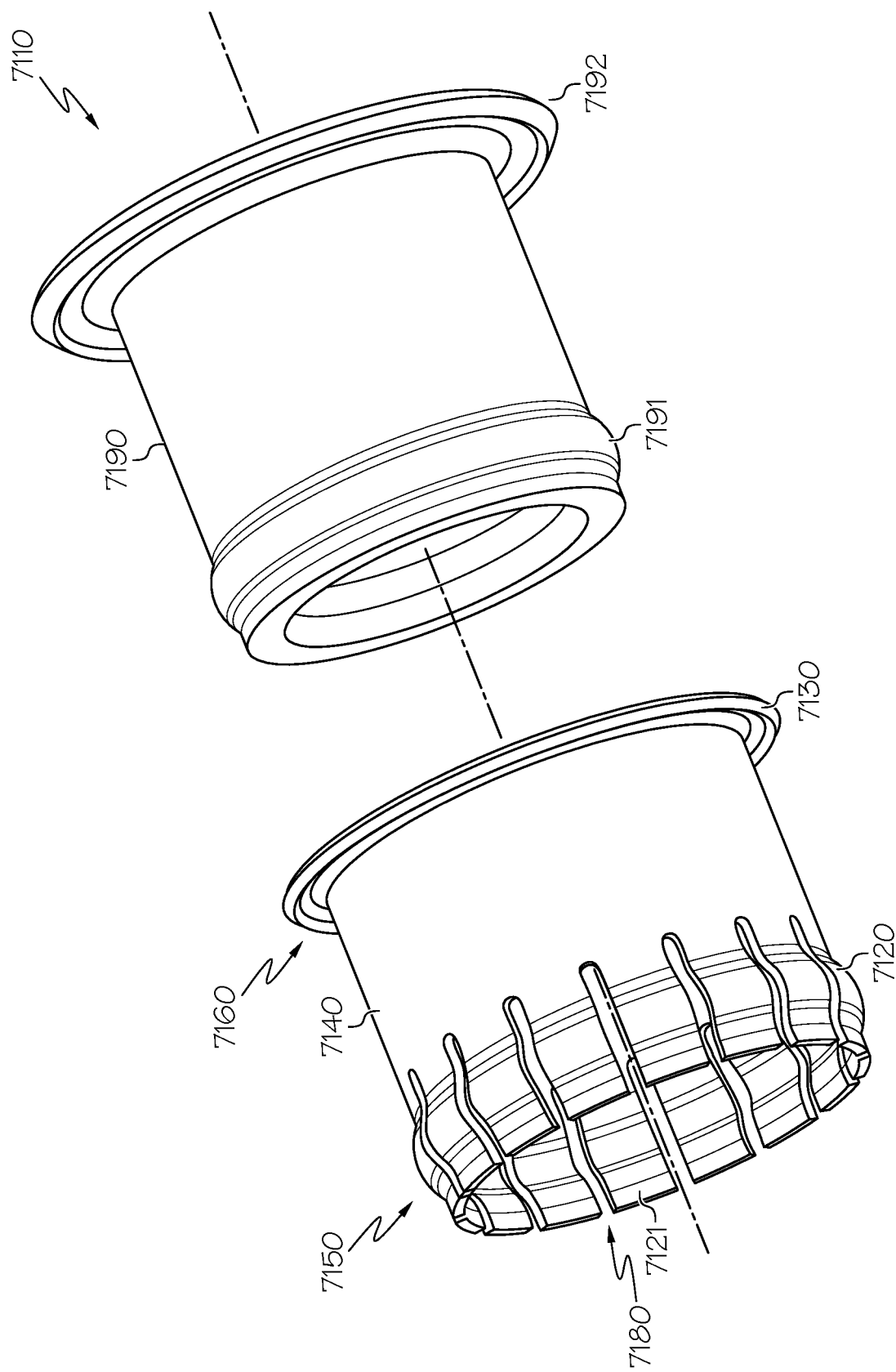
FIG. 26 is an exploded perspective view of an example of the disclosed structural assembly being secured by a plunger mechanical fastening system.
Figure 27:
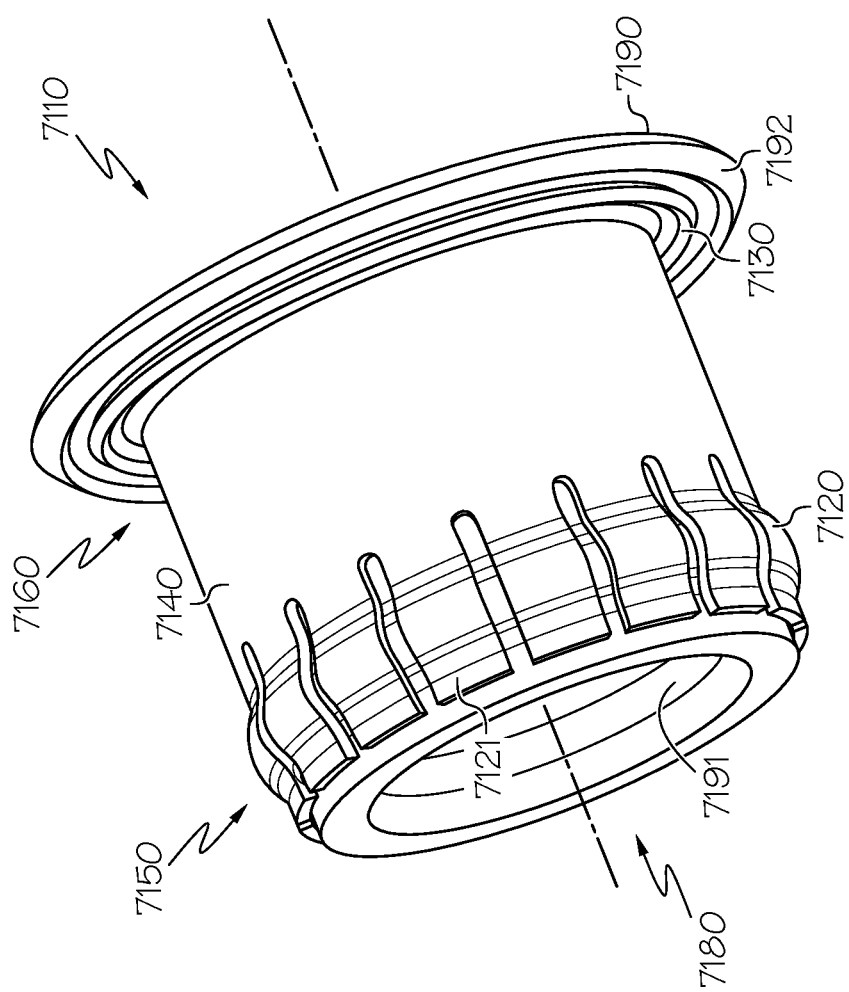
FIG. 27 is a perspective view of an example of the disclosed structural assembly being secured by a plunger mechanical fastening system.
Figure 28:
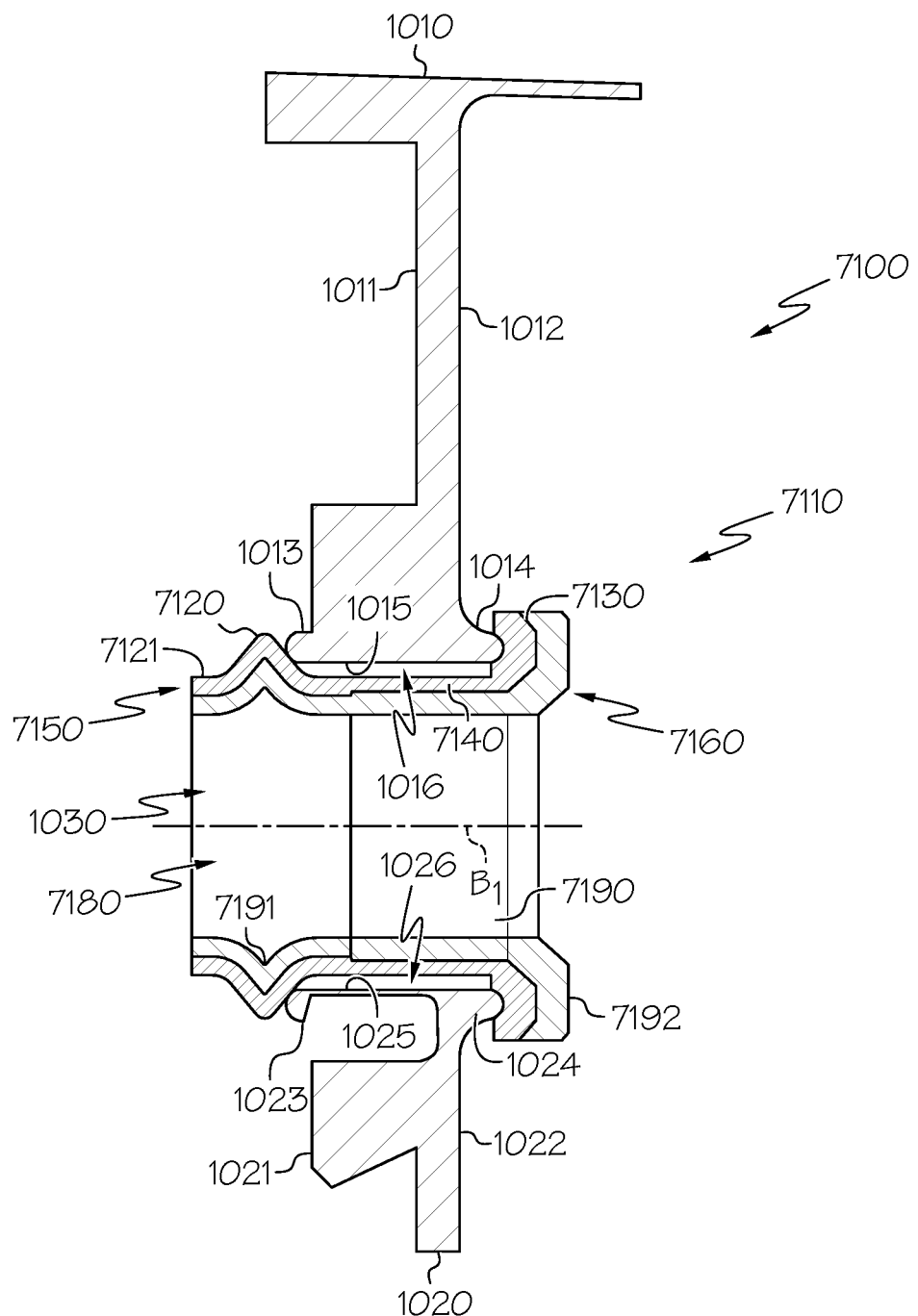
FIG. 28 is a cross-sectional view of an example of the disclosed structural assembly being secured by a plunger mechanical fastening system.

Referring to FIGS. 26, 27 and 28, in an alternative example, the disclosed structural assembly, generally designated 7100, includes a first structural member 1010 and a second structural member 1020 (as shown in FIG. 10). A mechanical fastening system 7110 couples the first structural member 1010 with the second structural member 1020. The mechanical fastening system 7110 includes a first engagement member 7120, a second engagement member 7130 a shaft 7140, and a plunger 7190. The shaft 7140 extends through the through-bore 1030, and includes a first end portion 7150 and a second end portion 7160. The first end portion 7150 may be integral with the first engagement member 7120 (e.g., the first engagement member 7120 and the first end portion 7150 of the shaft 7140 may be formed as a single monolithic body). The first engagement member 7120 may also protrude radially outward from the shaft 7140 and be defined by a plurality of discontinuous interfacing fingers 7121. The second end portion 7160 may be integral with the second engagement member 7130 (e.g., the second engagement member 7130 and the second end portion 7160 of the shaft 7140 may be formed as a single monolithic body). Further, the shaft 7140 may define a through-bore 7180 extending along the length of the shaft 7140. The plunger 7190 may be at least partially received by this through-bore 7180 and may include a protrusion 7191 that extends radially outwards.

Thus, by inserting the plunger 7190 into the through-bore 7180 of the shaft, the protrusion 7191 of the plunger 7190 may abuttingly engage the first engagement member 7120 such that the first engagement member 7120 is urged into engagement with both the first protrusion 1013 of the first structural member 1010 and the first protrusion 1023 of the second structural member 1020. Furthermore, the abutting engagement of the protrusion 7191 of the plunger 7190 with the first engagement member 7120 may urge the second engagement member 7130 into engagement with the second protrusion 1014 of the first structural member 1010 and the second protrusion 1024 of the second structural member 1020. As such, the insertion of the plunger 7190 into the through-bore 7180 of the shaft may secure the first structural member 1010 relative to the second structural member 1020.

Optionally, the plunger 7190 may also include a flange 7192 that abuttingly nests with the second engagement member 7130.

The examples disclosed in FIGS. 10-28 generally describe mechanical fastening systems having a circular cross-sectional shape. However, the shape of the mechanical fastening systems only needs to correspond generally with the shape of the structural members that the mechanical fastening systems are securing, which may be non-circular. Therefore, those skilled in the art will appreciate that mechanical fastening systems having other, non-circular cross-sectional shapes may be used without departing from the scope of the present disclosure.

Figure 29:
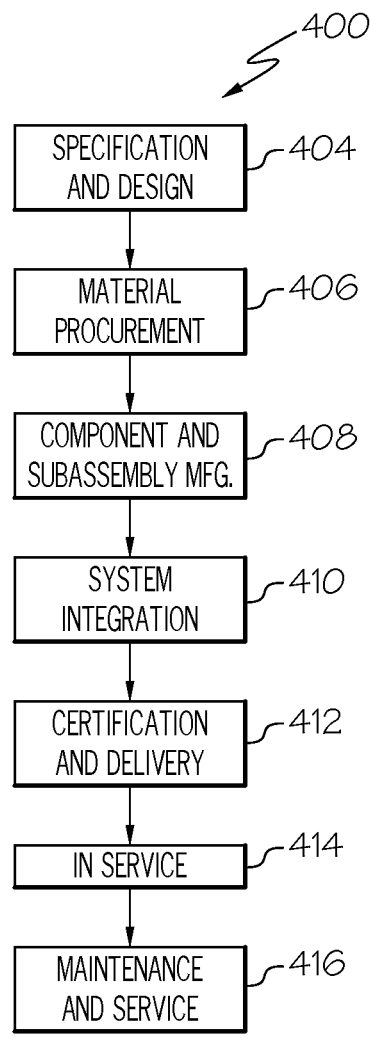
FIG. 29 is a flow diagram of an aircraft manufacturing and service methodology.
Figure 30:
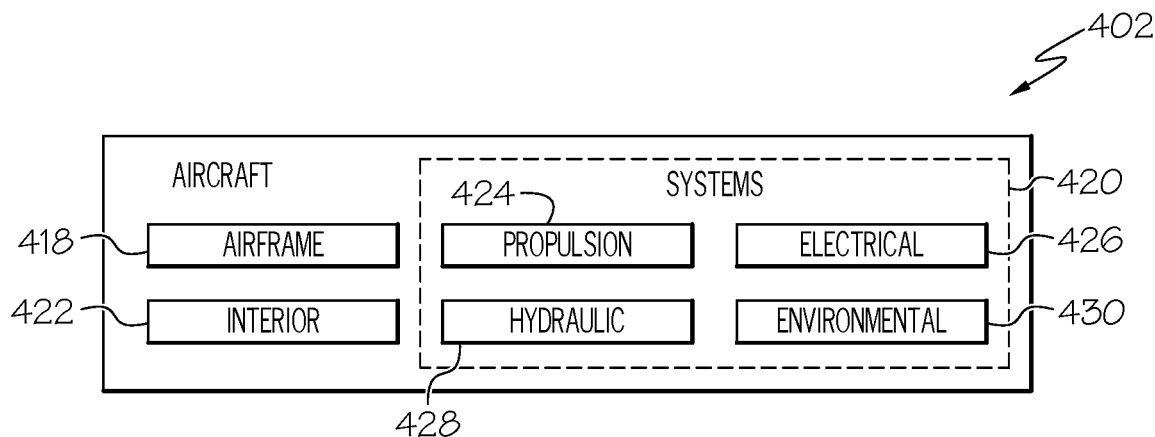
FIG. 30 is a block diagram of an aircraft.

Examples of the disclosure may be described in the context of an aircraft manufacturing and service method 400, as shown in FIG. 29 and an aircraft 402, as shown in FIG. 30. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 30, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed mechanical fastening system and associated structural assembly and method may be employed during any one or more of the stages of the aircraft manufacturing and service method 400. As one example, components or subassemblies corresponding to component/subassembly manufacturing 408, system integration 410, and or maintenance and service 416 may be fabricated or manufactured using the disclosed mechanical fastening system and associated structural assembly and method. As another example, the airframe 418 may be constructed using the disclosed mechanical fastening system and associated structural assembly and method. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed mechanical fastening system and associated structural assembly and method are described in the context of an aircraft; however, one of ordinary skill in the art will readily recognize that the disclosed mechanical fastening system and associated structural assembly and method may be utilized for a variety of applications. For example, the disclosed mechanical fastening system and associated structural assembly and method may be implemented in various types of vehicles including, e.g., helicopters, passenger ships, automobiles and the like.

Although various examples of the disclosed mechanical fastening system and associated structural assembly and method have been shown and described, modifications may occur to those skilled in the art upon reading the specification. The present application includes such modifications and is limited only by the scope of the claims.

What is claimed is:

1. A structural assembly comprising:
   a first structural member comprising a first side and a second side opposite said first side, and defining a first partial bore extending from said first side to said second side, said first structural member further comprising a first protrusion protruding proximate a periphery of said first partial bore on said first side of said first structural member and a second protrusion protruding proximate said periphery of said first partial bore on said second side of said first structural member;
   a second structural member comprising a first side and a second side opposite said first side, and defining a second partial bore extending from said first side to said second side, said second structural member further comprising a first protrusion protruding proximate a periphery of said second partial bore on said first side of said second structural member and a second protrusion protruding proximate said periphery of said second partial bore on said second side of said second structural member, wherein said second partial bore is aligned with said first partial bore along a bore axis to define a through-bore;
   a shaft extending through said through-bore, wherein said shaft comprises a first end portion and a second end portion longitudinally opposed from said first end portion;
   a first engagement member proximate said first end portion, wherein said first engagement member engages both said first protrusion of said first structural member and said first protrusion of said second structural member; and
   a second engagement member proximate said second end portion, wherein said second engagement member engages both said second protrusion of said first structural member and said second protrusion of said second structural member.

2. The structural assembly of claim 1 wherein said first engagement member is in threaded engagement with said first end portion of said shaft.

3. The structural assembly of claim 2 wherein said second engagement member is in threaded engagement with said second end portion of said shaft.

4. The structural assembly of claim 1 wherein said first end portion of said shaft comprises a mechanical deformation in abutting engagement with said first engagement member.

5. The structural assembly of claim 4 wherein said second end portion of said shaft comprises a mechanical deformation in abutting engagement with said second engagement member.

6. The structural assembly of claim 1 wherein said first engagement member comprises a mechanical deformation protruding from said first end portion of said shaft.

7. The structural assembly of claim 6 wherein said second engagement member comprises a mechanical deformation protruding from said second end portion of said shaft.

8. The structural assembly of claim 1 wherein said first engagement member is connected to said first end portion of said shaft.

9. The structural assembly of claim 8 wherein said connection comprises at least one of a joint, adhesive bond and interference fit.

10. The structural assembly of claim 8 wherein said second engagement member is connected to said second end portion.

11. The structural assembly of claim 1 wherein said shaft comprises a flange in abutting engagement with said first engagement member.

12. The structural assembly of claim 1 wherein said first engagement member is integral with said shaft.

13. The structural assembly of claim 1 wherein said shaft defines a through-bore extending along a length of said shaft.

14. The structural assembly of claim 1 wherein said shaft further comprises a protrusion extending radially outward from said first end portion of said shaft, wherein said protrusion is in abutting engagement with said first engagement member.

15. The structural assembly of claim 14 wherein said protrusion is defined by a plurality of discontinuous interfacing fingers.

16. The structural assembly of claim 1 wherein said first engagement member is integral with said first end portion of said shaft and protrudes radially outward from said shaft.

17. The structural assembly of claim 16 wherein said first engagement member is defined by a plurality of discontinuous interfacing fingers.

18. The structural assembly of claim 16 wherein: said shaft defines a through-bore extending along a length of said shaft, and said structural assembly further comprises a plunger at least partially received in said through-bore of said shaft.

19. The structural assembly of claim 18 wherein said plunger comprises a protrusion extending radially outward from said plunger, and wherein said protrusion urges said first engagement member radially outward.

20. A structural assembly comprising:
a first structural member comprising a first side and a second side opposite said first side, and defining a first partial bore extending from said first side to said second side, said first structural member further comprising a first set of protrusions wherein said first set of protrusions are ridges extending along a periphery of said first partial bore;
a second structural member comprising a first side and a second side opposite said first side, and defining a second partial bore extending from said first side to said second side, said second structural member further comprising a second set of protrusions wherein said second set of protrusions are ridges extending along a periphery of said second partial bore, wherein said second partial bore is aligned with said first partial bore along a bore axis to define a through-bore;
a shaft extending through said through-bore, wherein said shaft comprises a first end portion and a second end portion longitudinally opposed from said first end portion;
a first engagement member proximate said first end portion, wherein said first engagement member engages both said first set of protrusions of said first structural member and said second set of protrusions of said second structural member; and
a second engagement member proximate said second end portion, wherein said second engagement member engages both said first set of protrusions of said first structural member and said second set of protrusions of said second structural member.

* * * * *